United States Patent
Talebi Fard et al.

(10) Patent No.: US 10,973,040 B2
(45) Date of Patent: Apr. 6, 2021

(54) DATA NOTIFICATION DURING A SERVICE REQUEST PROCEDURE

(71) Applicants: Peyman Talebi Fard, Sterling, VA (US); Esmael Dinan, McLean, VA (US); Kyungmin Park, Herndon, VA (US); Weihua Qiao, Herndon, VA (US)

(72) Inventors: Peyman Talebi Fard, Sterling, VA (US); Esmael Dinan, McLean, VA (US); Kyungmin Park, Herndon, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 113 days.

(21) Appl. No.: 16/196,575

(22) Filed: Nov. 20, 2018

(65) Prior Publication Data
US 2019/0159227 A1    May 23, 2019

Related U.S. Application Data

(60) Provisional application No. 62/588,743, filed on Nov. 20, 2017.

(51) Int. Cl.
*H04W 72/12* (2009.01)
*H04W 8/22* (2009.01)
(Continued)

(52) U.S. Cl.
CPC ......... *H04W 72/1263* (2013.01); *H04W 8/22* (2013.01); *H04W 28/08* (2013.01); *H04W 76/00* (2013.01); *H04W 8/082* (2013.01); *H04W 8/18* (2013.01); *H04W 48/18* (2013.01); *H04W 60/00* (2013.01)

(58) Field of Classification Search
CPC ... H04W 28/08; H04W 72/1263; H04W 8/22; H04W 48/18; H04W 60/00; H04W 8/082; H04W 8/18
See application file for complete search history.

(56) References Cited

U.S. PATENT DOCUMENTS

2018/0198867 A1* 7/2018 Dao .................. H04W 76/34

OTHER PUBLICATIONS

NPL1—3GPP TS 23.214 V15.0.0 (Sep. 2017); Technical Specification; 3rd Generation Partnership Project; Technical Specification Group Services and System Aspects; Architecture enhancements for control and user plane separation of EPC nodes;; Stage 2.
(Continued)

*Primary Examiner* — Melvin C Marcelo
*Assistant Examiner* — Natali Pascual Peguero
(74) *Attorney, Agent, or Firm* — David Grossman; Kavon Nasabzadeh; Philip Smith

(57) ABSTRACT

An access and mobility management function (AMF) may receive a plurality of data notifications from one or more session management functions. The plurality of data notifications may be for activation of user plane connections for a plurality of wireless devices. The AMF may determine a first time duration based on a traffic of the plurality of data notifications. The first time duration may be a data notification delay value. The AMF may send at least one first message to the one or more session management functions. The at least one first message may be to delay sending a plurality of data notifications to the AMF. The at least one first message may comprise the first time duration.

20 Claims, 16 Drawing Sheets

(51) Int. Cl.
    H04W 76/00     (2018.01)
    H04W 28/08     (2009.01)
    H04W 8/08      (2009.01)
    H04W 48/18     (2009.01)
    H04W 8/18      (2009.01)
    H04W 60/00     (2009.01)

(56) References Cited

OTHER PUBLICATIONS

NPL2—3GPP TS 23.401 V15.1.0 (Sep. 2017); Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15).
3GPP TS 23.501 V1.5.0 (Nov. 2017); Technical Specification; 3rd Generation Partnership Project; Technical Specification Group Services and System Aspects; System Architecture for the 5G System; Stage 2; (Release 15).
3GPP TS 23.502 V1.3.0 (Nov. 2017); Technical Specification; 3rd Generation Partnership Project; Technical Specification Group Services and System Aspects; Procedures for the 5G System; Stage 2; (Release 15).
3GPP TS 23.682 V15.2.0 (Sep. 2017); Technical Specification; 3rd Generation Partnership Project; Technical Specification Group Services and System Aspects; Architecture enhancements to facilitate communicationswith packet data networks and applications (Release 15).
S2-174826 was 4382—NAPS—Idle Status Indication; 3GPP TSG-SA WG2 Meeting #122 S2-174826 San Jose Del Cabo, Mexico Jun. 26-30, 2017 (Revision of S2-174382).
S2-176892—CongestionOverloadControl—v3; SA WG2 Meeting #123; Oct. 23-27, 2017, Ljubljana, Slovenia(was S2-17xxxx); ; Source:Nokia, Nokia Shanghai Bell, Verizon, Ericsson, Intel, Cisco, Samsung, LG Electronics, SK Telecom; Title:TS 23.501: OI#5—Overload Control; Document for:Approval.
S2-176984_Overload-23501_ver6; SA WG2 Meeting #123; Oct. 23-27, 2017, Ljubljana, Slovenia(was S2-17xxxx); ; Source:Ericsson, Verizon, Nokia, Samsung, Cisco, Intel; Title:Support for Congestion/ control; Document for: Discussion/Approval.
S2-176988_Editorial-23502_ver3; SA WG2 Meeting #123; Oct. 23-27, 2017, Ljubljana, Slovenia(was S2-17xxxx); Source:Ericsson (Rapporteur); Title:Editorial corrections and alignment; Document for:Approval.
S2-176993; Network triggered Service Reqeust; SA WG2 Meeting #123; Oct. 23-27, 2017, Ljubljana, SI(revision of S2-17xxxx); ; Source:Ericsson; Title:Network Triggered Service Request improvement; Document for:Approval.
S2-177074-PCR-23502-MTServiceReq-Handling-UPF-Relocation; SA WG2 Meeting #123; Oct. 23-27, 2017, Ljubljana, Slovenia; Source:Huawei, Hisilicon; Title:Addressing EN in service request procedure on handling UE moving out of area of interest—OI#15; Document for:Approval; Agenda Item:6.5.7.4.
S2-177089; TS23.502 Re-activating PDU sessions in 3GPP access via non 3GPP; SA WG2 Meeting #123; Oct. 23-27, 2017, Ljubljana, Slovenia(was S2-17xxxx); Source:ZTE; Title:TS 23.502: Trigger a UE via non-3GPP access for re-activating PDU sessions in 3GPP access; Document for:Discussion/Approval.
S2-177119; SA WG2 Meeting #123; Oct. 23-27, 2017, Ljubljana, Slovenia(was S2-17xxxx); ; Source:NEC; Title: TS 23.502: Cleanup Network triggered Service Request procedure; Document for:Approval.
S2-177142; Clarification UP Re-activation timer in NW triggered SR; SA WG2 Meeting #123; Oct. 23-27, 2017, Ljubljana, Slovenia(revision of S2-17xxxx); ; Source:LG Electronics; Title:TS 23.502: Clarification User Plane Re-activation timer in NW triggered SR; Document for:Approval.

S2-177203—TS23.401 introduction of ethernet PDN type—r1; 3GPP TSG-SA WG2 Meeting #123; Ljubljana, Slovenia, Oct. 23-27; CR-Form-v11.2.
S2-177344_nasnotification; SA WG2 Meeting #123; Oct. 23-27, 2017, Ljubljana, Slovenia(revision of S2-17xxxx); Source:Samsung, SK Telecom; Title:TS 23.502: NAS notification to initiate a Service Request procedure; Document for:Approval ; Agenda Item:6.5.10.
S2-177353_23502_NW triggered SR (signalling aspects); SA WG2 Meeting #123S2-177353 Oct. 23-27, 2017, Ljubljana, Slovenia(revision of S2-17xxxx); ; Source:LG Electronics; Title:TS 23.502: NW Service Request triggered by signalling messages; Document for:Approval.
S2-177356_23502_NW triggered SR (service based); SA WG2 Meeting #123; Oct. 23-27, 2017, Ljubljana, Slovenia(revision of S2-17xxxx); ; Source:LG Electronics; Title:TS 23.502: Service operation between AMF and SMF (N11 messages) during NW triggered Service Request procedure ; Document for:Approval.
S2-177357_Complete paging priority handling; SA WG2 Meeting #123; Oct. 23-27, 2017, Ljubljana, Slovenia (was S2-17—); Source:CATT; Title:Complete paging priority handling in SR procedure; Document for:Approval; Agenda Item:6.5.7.4.
S2-177361_Cleanup on extended buffering_v2; SA WG2 Meeting #123; Oct. 23-27, 2017, Ljubljana, Slovenia (was S2-17—); Source:CATT; Title:Cleanup on extended buffering; Document for:Approval; Agenda Item:6.5.7.4.
S2-177377 TS23.502 Cleanup to SR procedures v1; SA WG2 Meeting #123; Oct. 11-15, 2017, Ljubljana; Source: Huawei, HiSilicon; Title:TS 23.502: Cleanup to SR procedures ; Document for:Approval; Agenda Item:6.5.7.
S2-177391_TS 23.502 NW Triggered service request for N3GPP PDU session over 3GPP access; SA WG2 Meeting #123; Jun. 26-30, 2017 Ljubljana, Slovenia(revision of S2-17xxxx); ; Source:ETRI; Title:TS 23.502 NW Triggered service request for N3GPP PDU session over 3GPP access; Document for:Approval.
S2-177400_TS 23.502 Small update on network initiated service request procedure; SA WG2 Meeting #123S2; Jun. 26-30, 2017 Ljubljana, Slovenia(revision of S2-17xxxx); ; Source:ETRI; Title:TS 23.502 Small update on network initiated service request procedure; Document for:Approval.
S2-177409 TS 23.502 Updating Network triggered Service Request procedure to consider LADN service; SA WG2 Meeting #123; Oct. 23-27, 2017, Ljubljana, Slovenia; Source:ETRI; Title:TS 23.502: Updating Network triggered Service Request procedure to consider LADN service; Document for:Approval; Agenda Item:6.5.7.4.
S2-177432 23.501 PDU Session Reachability Management; SA WG2 Meeting #S2-123; Oct. 23-27, 2017, Ljubljana, Slovenia(was S2-17xxxx); Source:Samsung; Title:TS 23.501: PDU session reachability management; Document for:Agreement; Agenda Item:6.5.3.
S2-177462_Update on the activation of UP connection_23502 v1.0; SA WG2 Meeting #123; Oct. 23-27, 2017, Ljubljana, Slovenia(revision of S2-17xxxx); Source:Huawei, HiSilicon; Title:Update on the activation of UP connection; Document for:Approval; Agenda Item:6.5.10.
S2-177511_OI#5_TS23.501_Congestion Control for the Control Plane Funtions; SA WG2 Meeting #123S2-177511 Oct. 23-27, 2017, Ljubljana, Slovenia(Revision of S2-17xxxx); ; Source:Huawei, HiSilicon; Title:OI#5: TS 23.501: Congestion Control for the Control Plane Functions; Document for:Discussion.
S2-177520_OI#24_TS23.502_Optimization of paging on N3GPP access; SA WG2 Meeting #123; Oct. 23-27, 2017, Ljubljana, Slovania(Revision of S2-17Xxxx); ; Source:Huawei, HiSilicon; Title:OI#24: TS 23.502: Optimization of paging on N3GPP access; Document for:Approval.
S2-177522_TS23.502_Paging Priority considering RRC-inactive; SA WG2 Meeting #123; Oct. 23-27, 2017, Ljubljana, Slovenia(Revision of S2-17xxxx); ; Source:Huawei, HiSilicon; Title:TS 23.502: Paging Priority considering RRC-inactive; Document for:Approval.
S2-177565-PCR-OI#18 23501_Interaction between SMF and UPF_r3.7; SA WG2 Meeting #123S2-177565 Oct. 23-27, 2017, Ljubljana, Slovenia(revision of S2-17xxxx); Source:Huawei, HiSilicon; Title:OI#18 TS 23.501: Interaction between SMF and UPF on N4 Reference Point; Document for:Discussion and Approval; Agenda Item:6.5.3.

(56) References Cited

OTHER PUBLICATIONS

S2-177567_PCR 23.501 Extended Buffering draft v 06; SA WG2 Meeting #123; Oct. 23-27, 2017, Ljubljana, Slovenia(Revision of S2-175803); ; Source:Huawei, HiSilicon; Title:TS 23.501: Update User Plane Management Procedures with Buffer Management ; Document for:Approval.
S2-177971 was7567_PCR 23.501 Extended Buffering draft v 07; SA WG2 Meeting #123; Oct. 23-27, 2017, Ljubljana, Slovenia(Revision of S2-177567); ; Source:Huawei, HiSilicon; Title:TS 23.501: Update User Plane Management Procedures with Buffer Management ; Document for:Approval.
S2-178097 was7868 PCR-OI#18 23501_Interaction between SMF and UPF_r4.1; SA WG2 Meeting #123; Oct. 23-27, 2017, Ljubljana, Slovenia(revision of S2-177868); Source:Huawei, HiSilicon, Samsung, SK Telecom; Title: OI#18 TS 23.501: Interaction between SMF and UPF on N4 Reference Point; Document for:Discussion and Approval; Agenda Item:6.5.3.

* cited by examiner

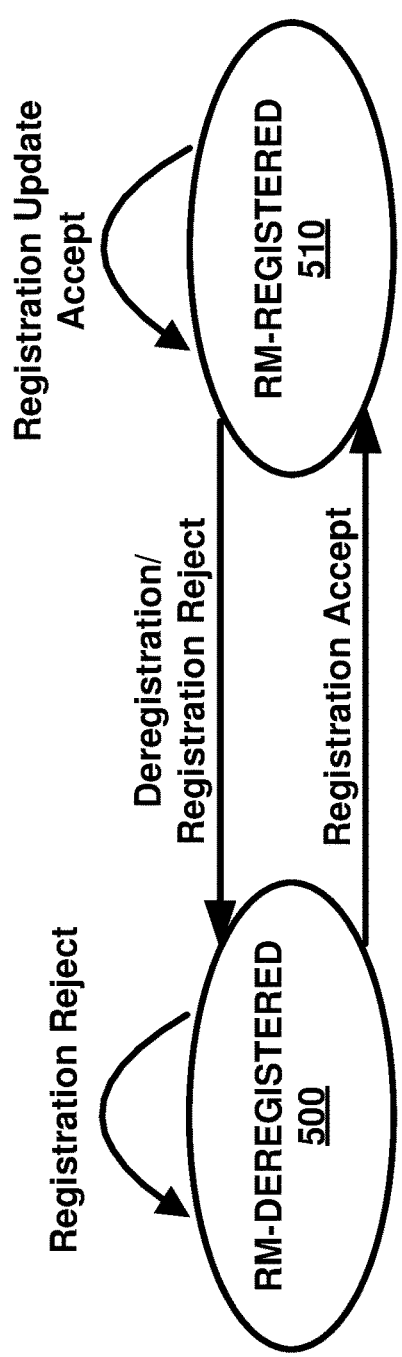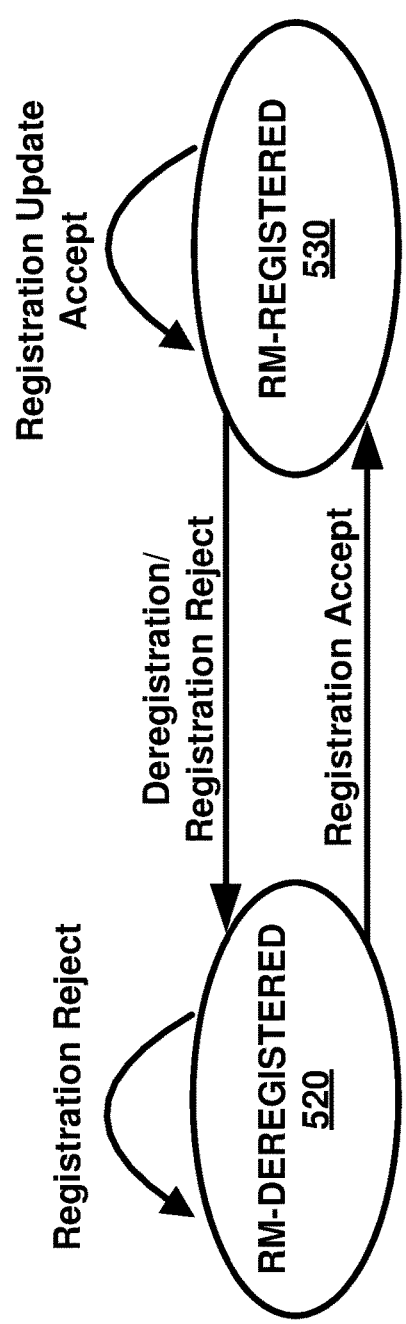

CM State Transition in UE

CM State Transition in AMF

DATA NOTIFICATION DURING A SERVICE REQUEST PROCEDURE

CROSS-REFERENCE TO RELATED APPLICATIONS

This application claims the benefit of U.S. Provisional Application No. 62/588,743, filed Nov. 20, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of an disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

The following acronyms are used throughout the present disclosure:

| | |
|---|---|
| 5G | 5th generation mobile networks |
| 5GC | 5G Core Network |
| 5GS | 5G System |
| 5G-AN | 5G Access Network |
| 5QI | 5G QoS Indicator |
| AF | Application Function |
| AMF | Access and Mobility Management Function |
| AN | Access Network |
| CDR | Charging Data Record |
| CCNF | Common Control Network Functions |
| CIoT | Cellular IoT |
| CN | Core Network |
| CP | Control Plane |
| DDN | Downlink Data Notification |
| DL | Downlink |
| DN | Data Network |
| DNN | Data Network Name |
| F-TEID | Fully Qualified TEID |
| GTP | GPRS Tunneling Protocol |
| IMSI | International Mobile Subscriber Identity |
| LADN | Local Area Data Network |
| LI | Lawful Intercept |
| MEI | Mobile Equipment Identifier |
| MICO | Mobile Initiated Connection Only |
| MME | Mobility Management Entity |
| MO | Mobile Originated |
| MSISDN | Mobile Subscriber ISDN |
| MT | Mobile Terminating |
| N3IWF | Non-3GPP InterWorking Function |
| NAI | Network Access Identifier |
| NAS | Non- Access Stratum |
| NB-IoT | Narrow Band IoT |
| NEF | Network Exposure Function |
| NF | Network Function |
| NGAP | Next Generation Application Protocol |
| NR | New Radio |
| NRF | Network Repository Function |
| NSI | Network Slice Instance |
| NSSAI | Network Slice Selection Assistance Information |
| NSSF | Network Slice Selection Function |
| OCS | Online Charging System |
| OFCS | Offline Charging System |
| PCF | Policy Control Function |
| PDU | Packet Data Unit |
| PEI | Permanent Equipment Identifier |
| PLMN | Public Land Mobile Network |
| RAN | Radio Access Network |
| QFI | QoS Flow Identity |
| RM | Registration Management |
| S1-AP | S1 Application Protocol |
| SBA | Service Based Architecture |
| SEA | Security Anchor Function |
| SCM | Security Context Management |
| SMF | Session Management Function |
| SMSF | SMS Function |
| S-NSSAI | Single Network Slice Selection Assistance information |
| SUPI | Subscriber Permanent Identifier |
| TEID | Tunnel Endpoint Identifier |
| UE | User Equipment |
| UL | Uplink |
| UL CL | Uplink Classifier |
| UPF 110 | User Plane Function |

Figure 1:
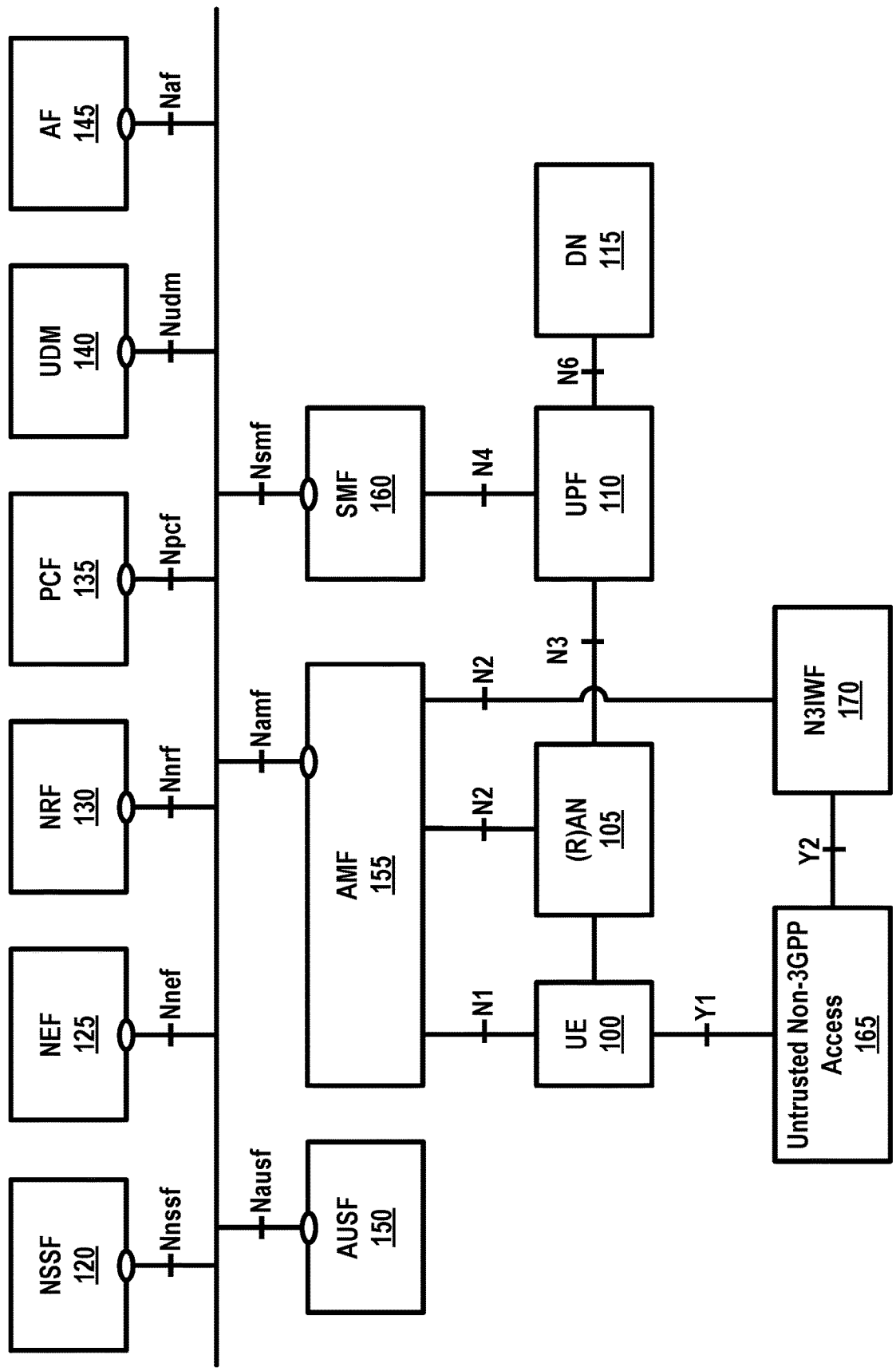
FIG. 1 is a diagram of an example 5G system architecture as per an aspect of an embodiment of the present disclosure.
Figure 2:
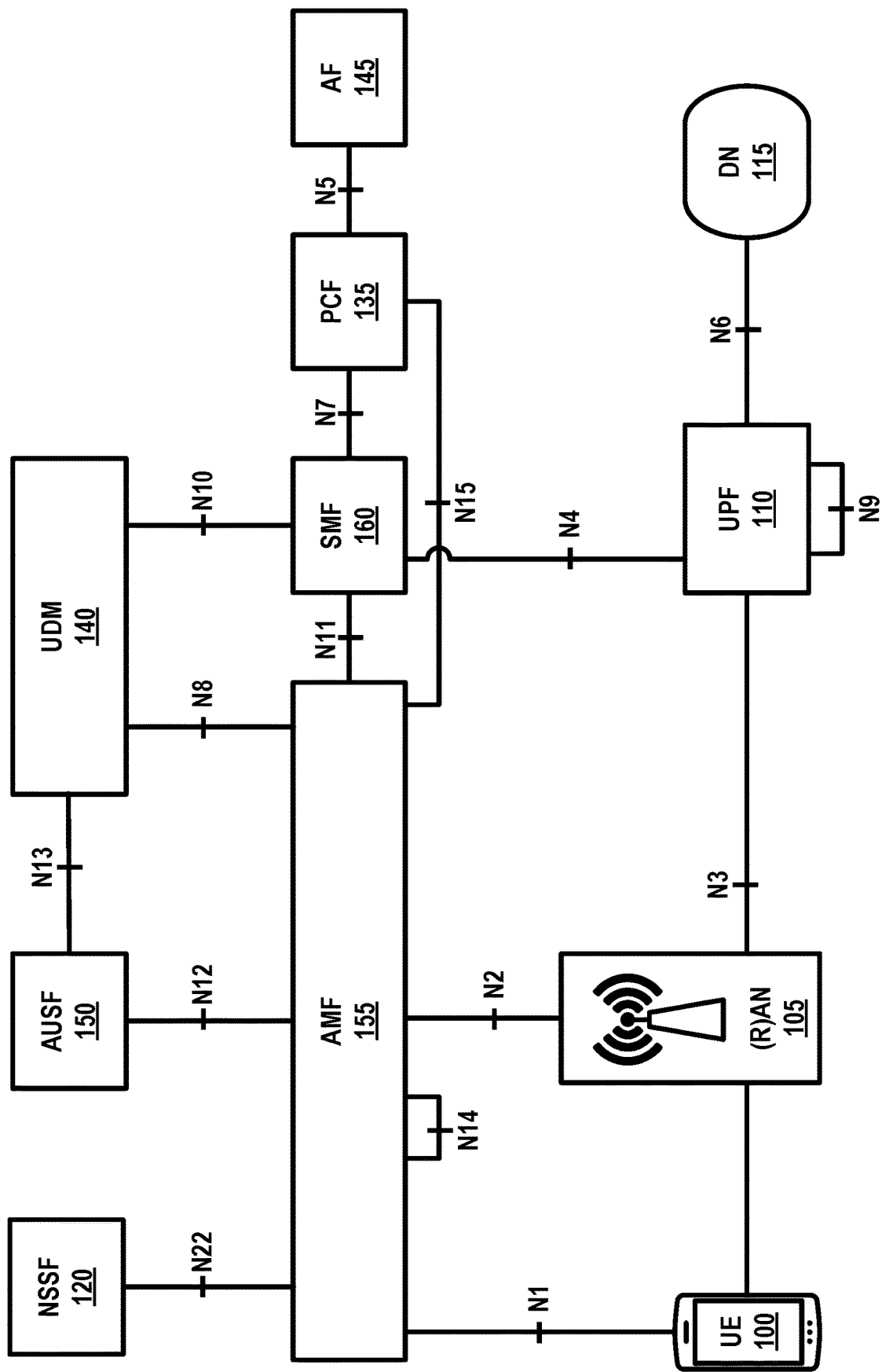
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
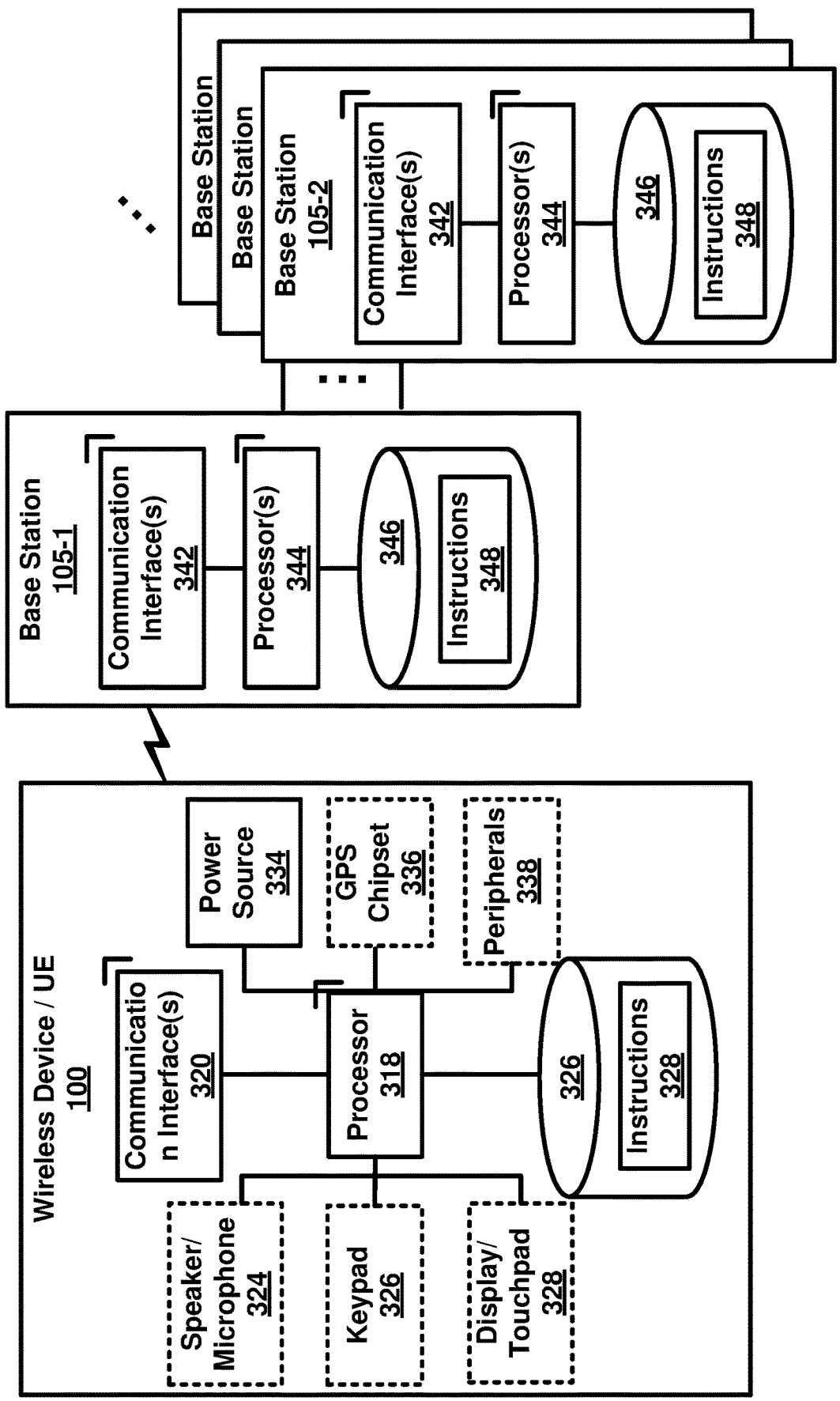
FIG. 3 is a system diagram of an example wireless device and a network node in a 5G system as per an aspect of an disclosure.
Figure 4:
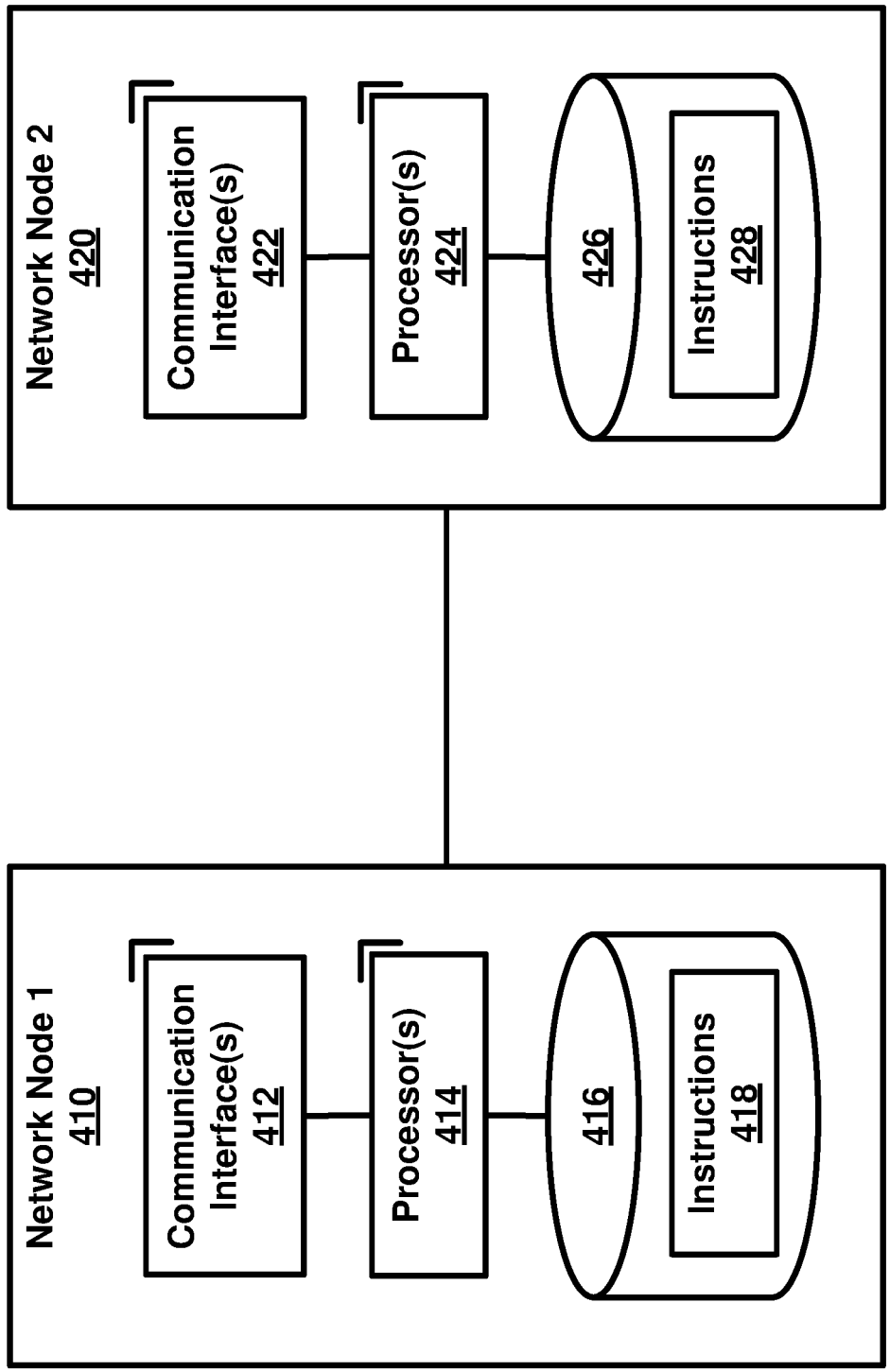
FIG. 4 is a system diagram of an example wireless device as per an aspect of an disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS, lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may also provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may also be employed once PDU session is established. IPv6 prefix allocation may be supported via IPv6 stateless autoconfiguration, if IPv6 is supported. IPv6 parameter configuration via stateless DHCPv6 may also be supported.

The 5GC may support the allocation of a static IPv4 address and/or a static IPv6 prefix based on subscription information in the UDM 140 or based on the configuration on a per-subscriber, per-DNN basis.

User plane function(s) (UPF 110(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
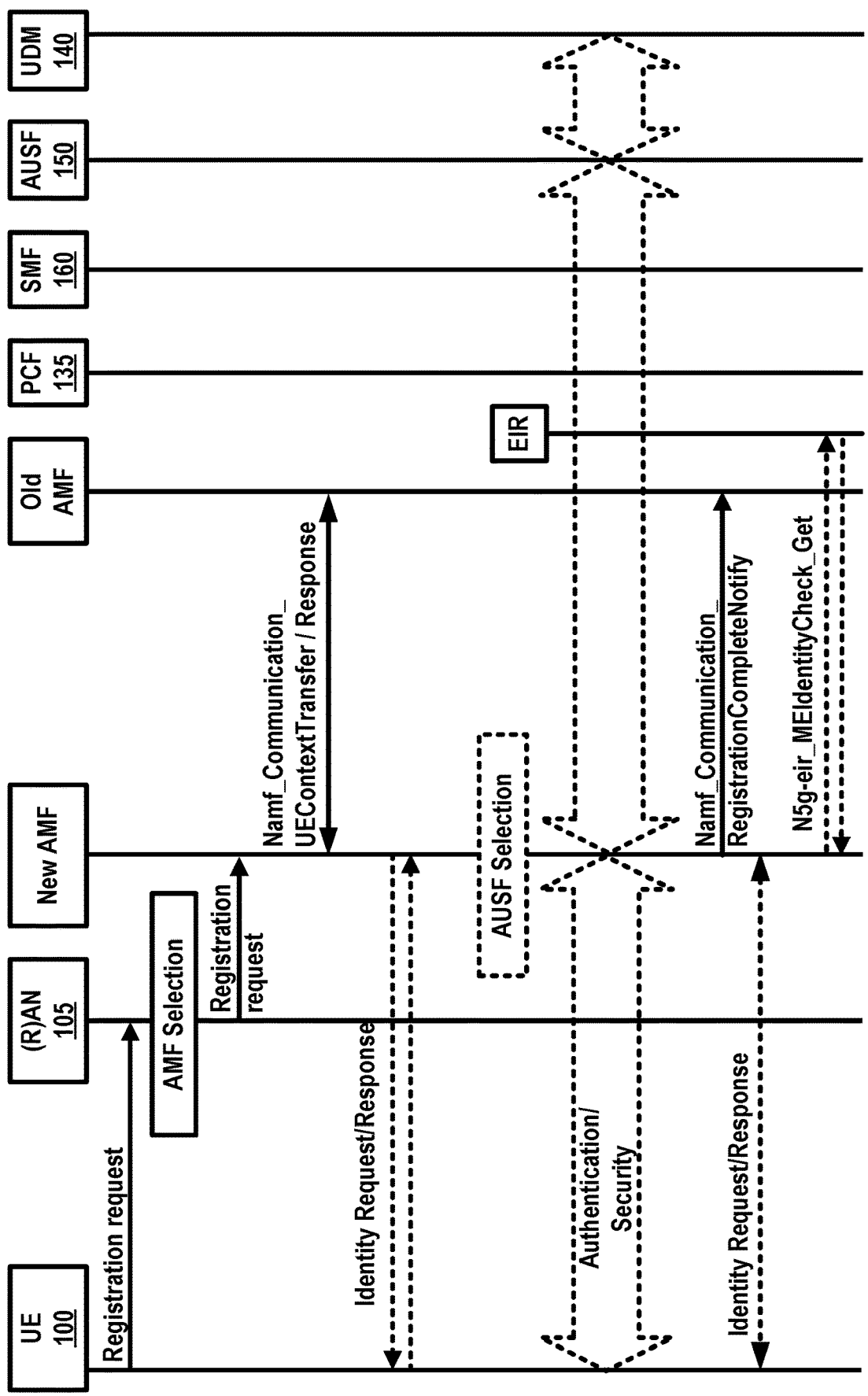
FIG. 8 is an example call flow as per an aspect of an disclosure.
Figure 9:
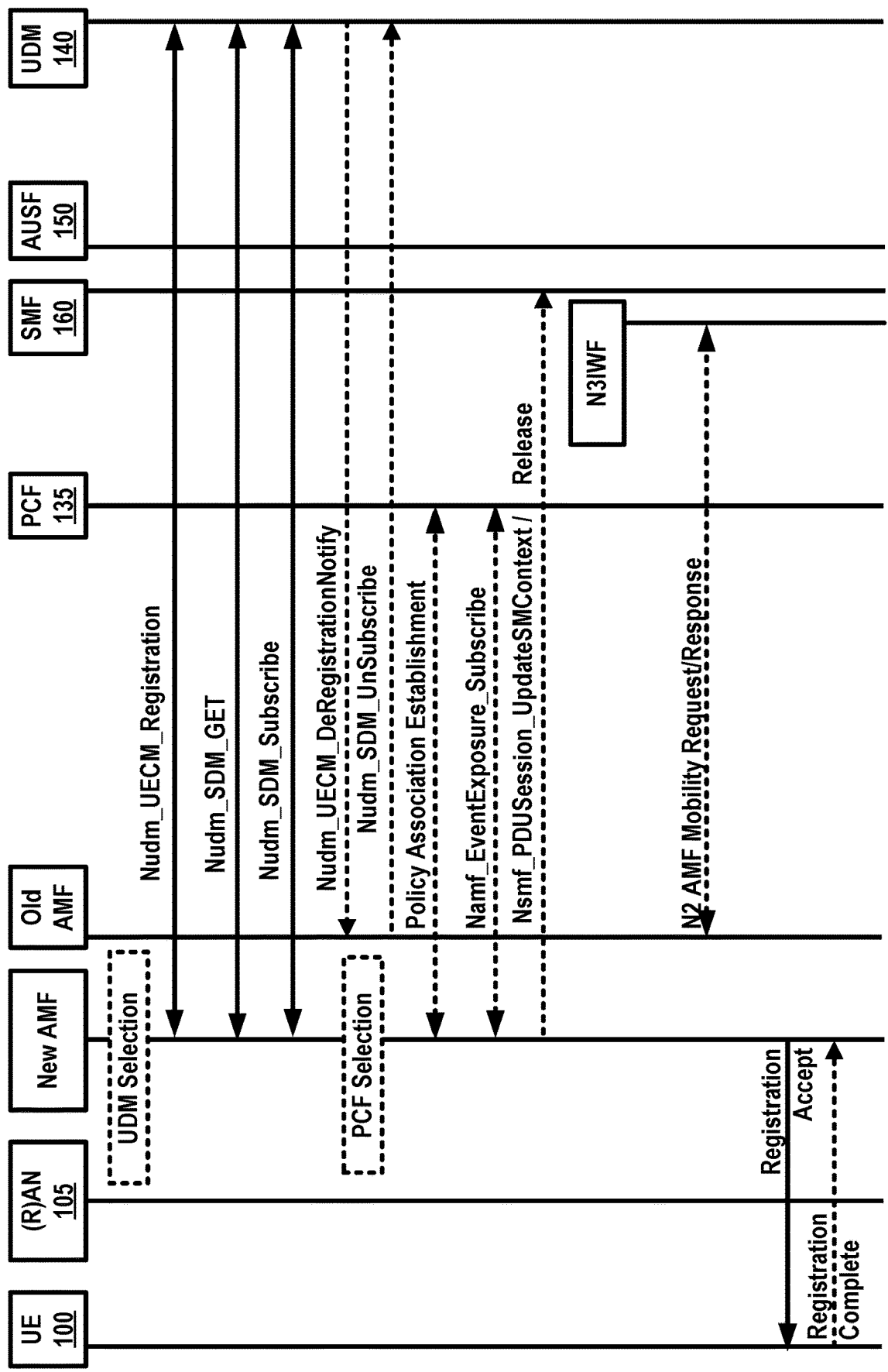
FIG. 9 is an example call flow as per an aspect of an disclosure.

The initial registration procedure as depicted in example FIG. 8 and FIG. 9 may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

FIG. 5A and FIG. 5B depict the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6A:
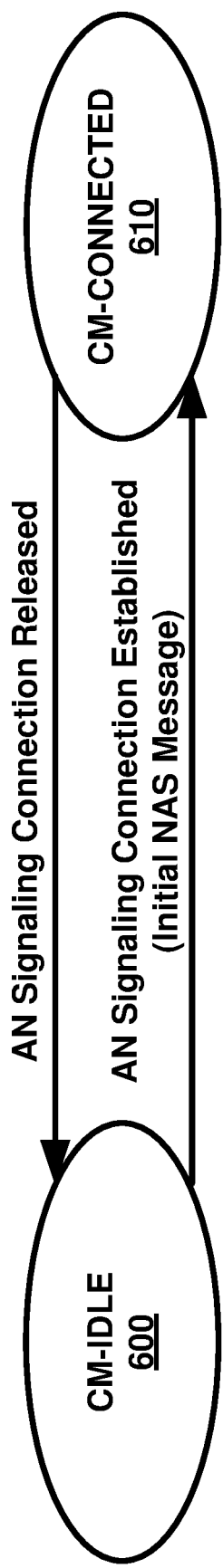
FIG. 6A and FIG. 6B depict two connection management state models in UE 100 and AMF 155 as per an aspect of an disclosure.
Figure 6B:
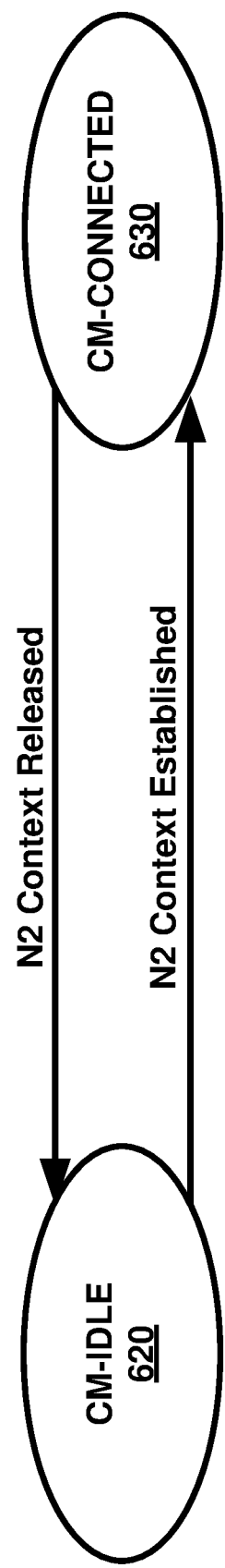

As shown in FIG. 6A and FIG. 6B, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish the NAS signaling connection for a UE 100 in CM-IDLE 600 state. The procedure of releasing the NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
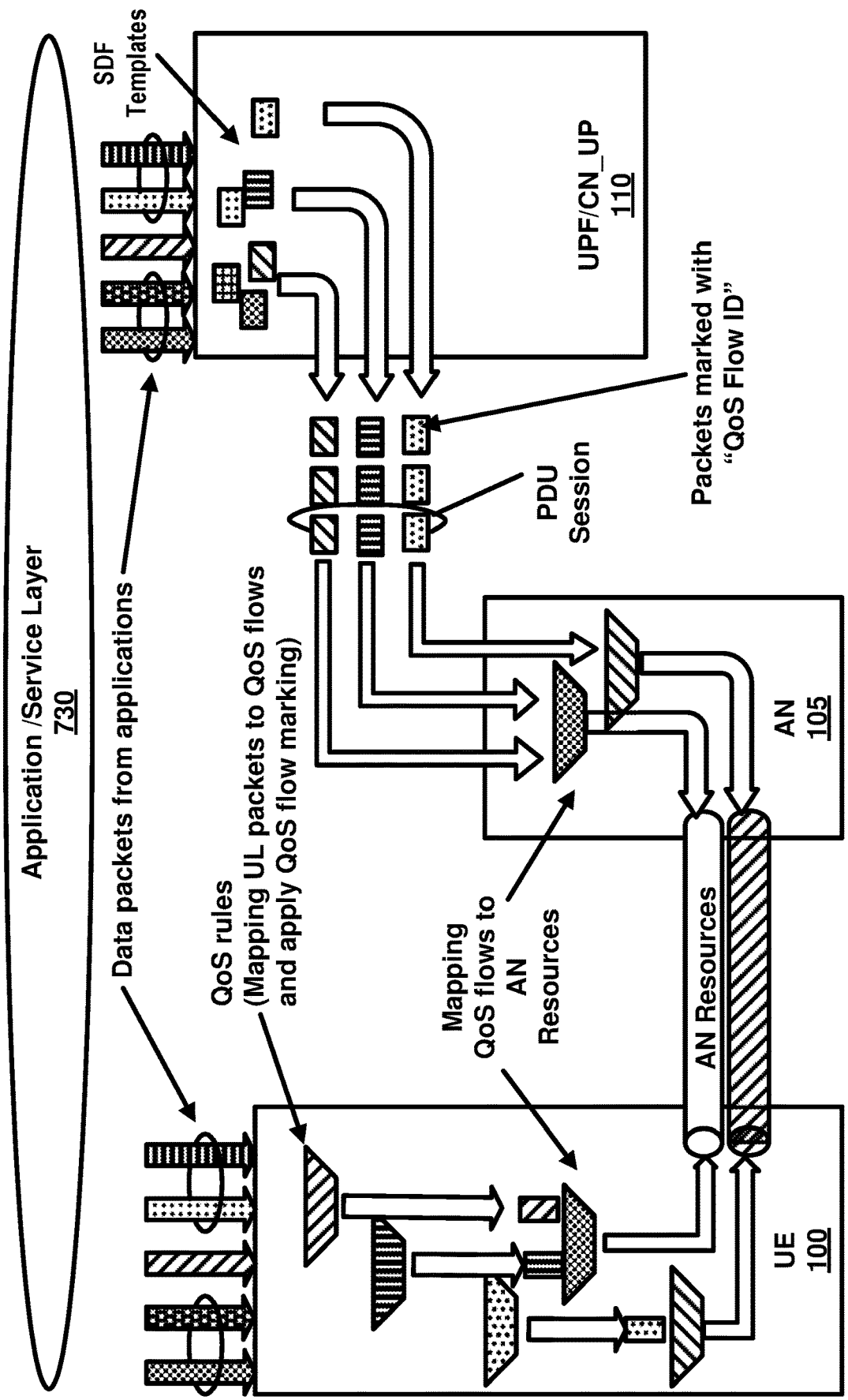
FIG. 7 is diagram for classification and marking traffic as per an aspect of an disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may also support reflective QoS. The QoS model may comprise flow mapping or packet marking at the UPF 110 (CN_UP) 110, AN 105 and/or UE 100. Packets may arrive from and/or destined to the application/service layer 730 of UE 100, UPF 110 (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may also include point-to-point reference points where necessary. (2) FIG. 2 is an example reference point representation, showing the interaction between the NF services in the network functions described by point-to-point reference point (e.g. N11) between any two network functions.

Figure 10:
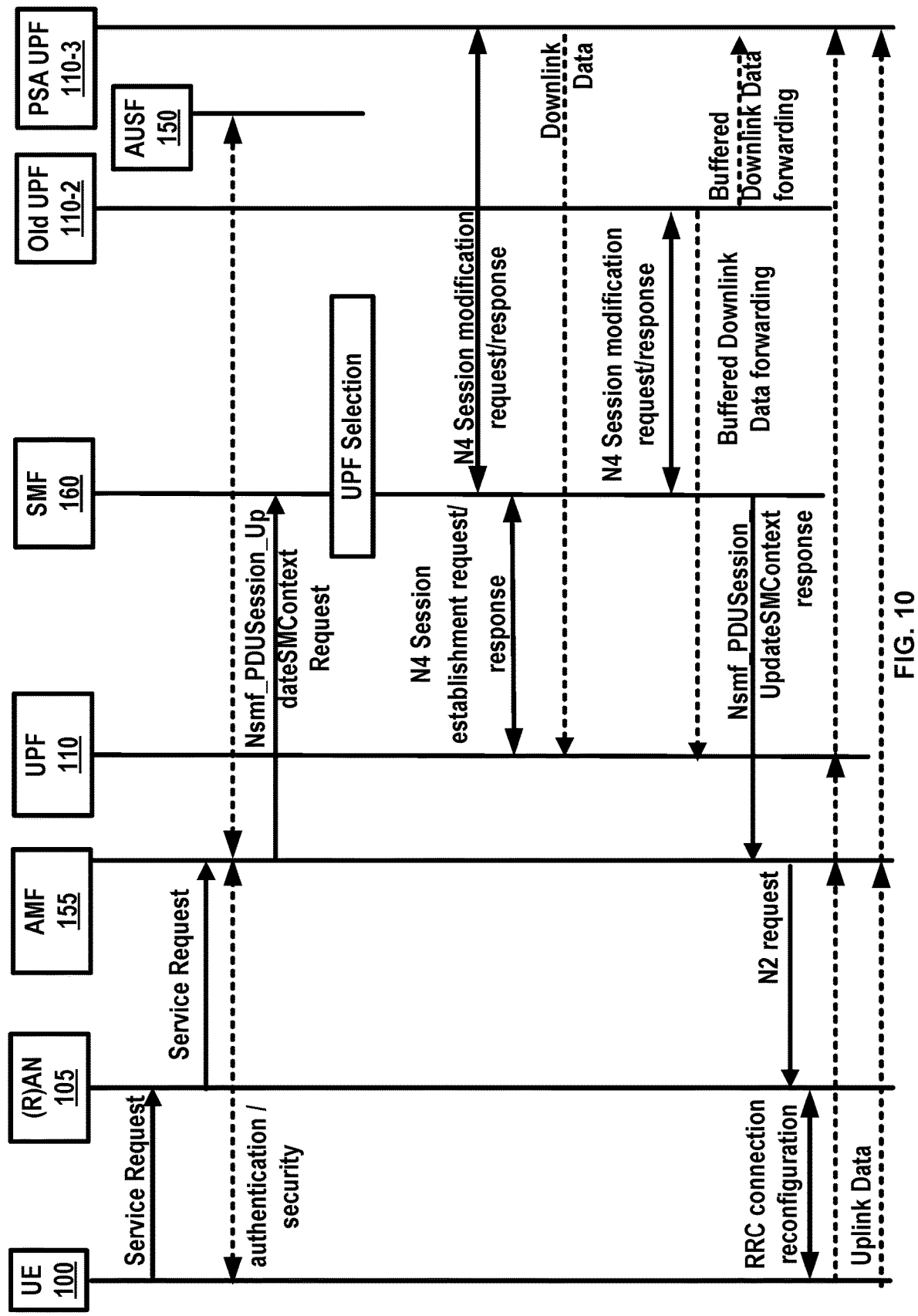
FIG. 10 is an example call flow as per an aspect of an embodiment of the present disclosure.
Figure 11:
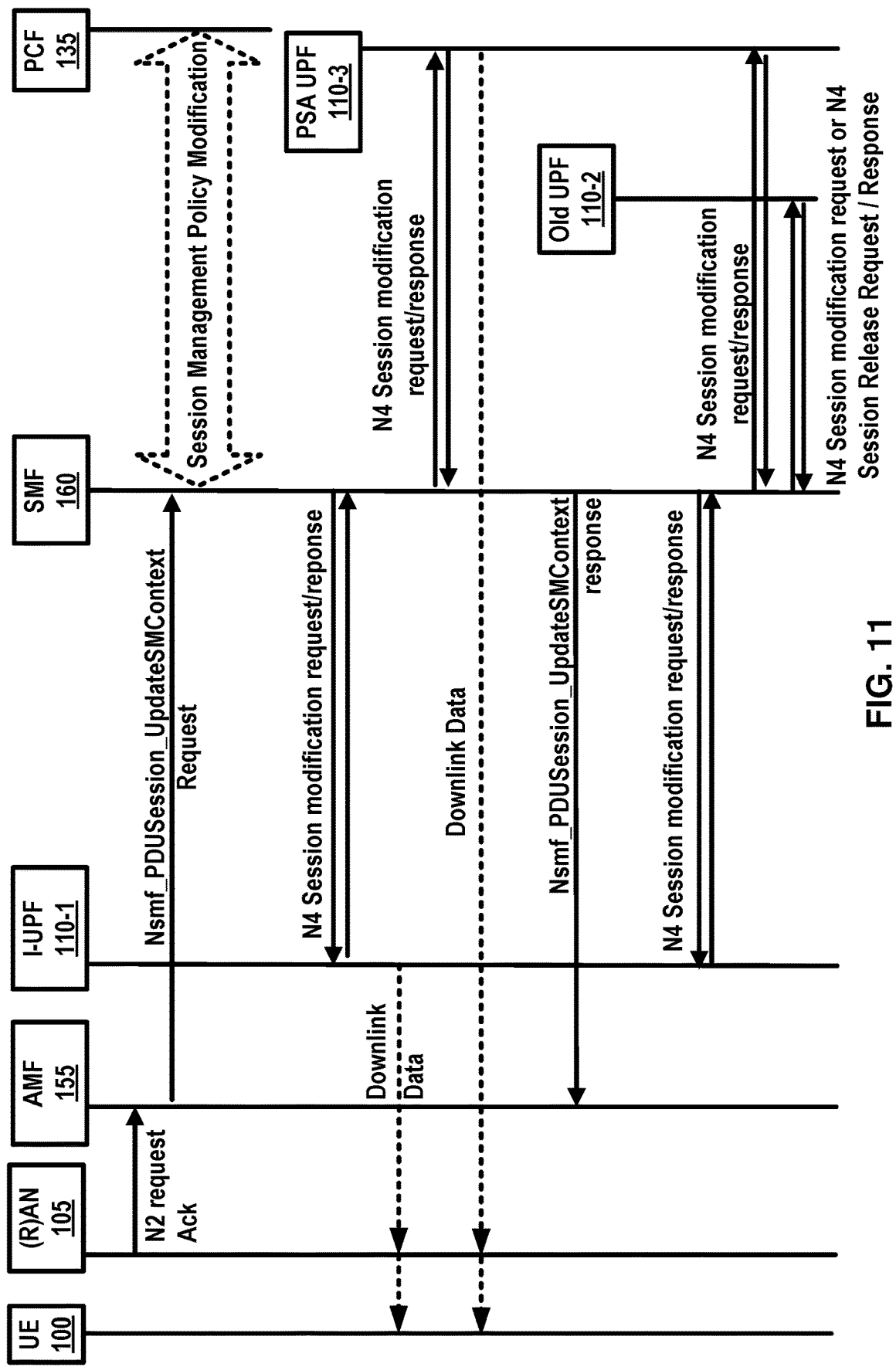
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. The service request procedure may be used to activate a user plane connection for an established PDU Session. The service request procedure may be triggered by the UE 100 or the 5GC, and may be used when the UE 100 is in CM-IDLE and/or in CM-CONNECTED and may allow selectively to activate user plane connections for some of the established PDU Sessions.

The UE 100 in CM IDLE state may initiate the service request procedure in order to send uplink signaling messages, user data, as a response to a network paging request and/or the like. After receiving the service request message, the AMF 155 may perform authentication. After the establishment of the signaling connection to the AMF 155, the UE 100 or network may send signaling messages, e.g. PDU Session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU Session Anchor PSA UPF 110-3 may be involved.

In an example, the UE 100 may send to a (R)AN 105 an AN message comprising AN parameters, Mobility Management, MM NAS Service Request (e.g., list of PDU Sessions to be activated, list of allowed PDU sessions, security parameters, PDU session status)). The list of PDU sessions to be activated may be provided by the UE 100 when the UE 100 may re-activate the PDU session(s). The list of allowed PDU sessions may be provided by the UE 100 when the service request may be a response of a paging or a NAS notification, and may identify the PDU sessions that may be transferred or associated to the access on which the Service Request may be sent. In an example, for the case of NG-RAN, the AN parameters may include selected PLMN ID and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU Session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU Session(s) whose UP connections may be activated in MM NAS service request message, by the list of PDU sessions to be activated. Otherwise the UE 100 may not identify any PDU Session(s) in the service request message for paging response.

If the service request over 3GPP access may be triggered in response to a paging indicating non-3GPP access, the NAS service request message may identify in the list of allowed PDU sessions the list of PDU Sessions associated with the non-3GPP access that may be re-activated over 3GPP. In an example, the PDU Session status may indicate the PDU sessions available in the UE 100. In an example, the UE 100 may not trigger the service request procedure for a PDU Session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message comprising N2 parameters, MM NAS Service Request, and/or the like. The AMF 155 may reject the N2 message if it may not be able to handle the service request. In an example, if NG-RAN may be used, the N2 parameters may include the 5G-GUTI, Selected PLMN ID, Location information, RAT type, Establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU Session status, the AMF 155 may initiate PDU session release procedure in the network for the PDU sessions whose PDU Session ID(s) may be indicated by the UE 100 as not available.

In an example, if the service request was not sent integrity protected or integrity protection verification failed, the AMF 155 may initiate a NAS authentication/security procedure.

In an example, if the UE 100 may trigger the service request to establish a signaling connection, upon successful establishment of the signaling connection, the UE 100 and the network may exchange NAS signaling.

In an example the AMF 155 may send to the SMF 160 a PDU session update context request e.g., Nsmf_PDUSession_UpdateSMContext Request comprising PDU Session ID(s), Cause(s), UE 100 location information, access type, and/or the like.

In an example, the Nsmf_PDUSession_UpdateSMContext Request may be invoked by the AMF 155 if the UE 100 may identify PDU Session(s) to be activated in the NAS Service Request message. In an example, the Nsmf_PDUSession_UpdateSMContext Request may be triggered by the SMF 160 wherein the PDU Session(s) identified by the UE 100 may correlate to other PDU Session ID(s) than the one triggering the procedure. In an example, the Nsmf_PDUSession_UpdateSMContext Request may be triggered by the SMF 160 wherein the current UE 100 location may be outside the "Area of validity for the N2 information" provided by the SMF 160 during a network triggered service request procedure. The AMF 155 may not send the N2 information provided by the SMF 160 during the network triggered service request procedure.

In an example, the AMF 155 may determine the PDU Session(s) to be activated and may send an Nsmf_PDUSession_UpdateSMContext Request to SMF(s) associated with the PDU Session(s) with Cause set to indicate "establishment of user plane resources" for the PDU Session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the User Plane for the PDU Session may not be re-activated. The Service Request Procedure may succeed without re-activating the User Plane of any PDU Sessions, and the AMF 155 may notify the UE 100.

In an example, if the PDU Session ID may correspond to a LADN and the SMF 160 may determine that the UE 100 may be outside the area of availability of the LADN based on the UE 100 location reporting from the AMF 155, the SMF 160 may decide to (based on local policies) keep the PDU Session, may reject the activation of user plane connection for the PDU session and may inform the AMF 155. In an example, if the procedure may be triggered by a Network Triggered Service Request, the SMF 160 may notify the UPF 110 that originated the Data Notification to discard downlink data for the PDU Sessions and/or to not provide further Data Notification messages. The SMF 160 may respond to the AMF 155 with an appropriate reject cause and the User Plane Activation of PDU Session may be stopped.

In an example, if the PDU Session ID may correspond to a LADN and the SMF 160 may determine that the UE 100 may be outside the area of availability of the LADN based on the UE 100 location reporting from the AMF 155, the SMF 160 may decide to (based on local policies) release the PDU Session. The SMF 160 may locally release the PDU Session and may inform the AMF 155 that the PDU Session may be released. The SMF 160 may respond to the AMF 155 with an appropriate reject cause and the User Plane Activation of PDU Session may be stopped.

In an example, if the UP activation of the PDU Session may be accepted by the SMF 160, based on the location info received from the AMF 155, the SMF 160 may check the UPF 110 Selection Criteria (e.g., UPF's dynamic load, UPF's relative static capacity among UPFs supporting the same DNN, UPF 110 location available at the SMF 160, UE 100 location information, Capability of the UPF 110 and the functionality required for the particular UE 100 session: An appropriate UPF 110 may be selected by matching the functionality and features required for an UE 100, Data Network Name (DNN), PDU Session Type (i.e. IPv4, IPv6, Ethernet Type or Unstructured Type) and if applicable, the static IP address/prefix, SSC mode selected for the PDU Session, UE 100 subscription profile in UDM, DNAI as included in the PCC Rules, Local operator policies, S-NSSAI, Access technology being used by the UE 100, and/or the like). The SMF may determine to continue using the current UPF(s). The SMF may determine to select a new intermediate UPF 110 (or add/remove an intermediate UPF 110), if the UE 100 has moved out of the service area of the UPF 110 that was previously connecting to the AN, while maintaining the UPF(s) acting as PDU Session Anchor. The SMF may determine to trigger re-establishment of the PDU Session to perform relocation of the UPF 110 acting as PDU Session Anchor, e.g. the UE 100 has moved out of the service area of the anchor UPF 110 which is connecting to RAN 105.

In an example, the SMF 160 may send to the UPF 110 (e.g., new intermediate UPF 110) an N4 Session Establishment Request. In an example, if the SMF 160 may select a new UPF 110 to act as intermediate UPF 110-2 for the PDU Session, or if the SMF 160 may select to insert an intermediate UPF for a PDU Session which may not have an intermediate UPF 110-2, an N4 Session Establishment Request message may be sent to the new UPF 110, providing Packet detection, Data forwarding, enforcement and reporting rules to be installed on the new intermediate UPF. The PDU Session Anchor addressing information (on N9) for this PDU Session may be provided to the intermediate UPF 110-2.

In an example, if a new UPF 110 is selected by the SMF 160 to replace the old (intermediate) UPF 110-2, the SMF 160 may include a Data forwarding indication. The Data Forwarding Indication may indicate to the UPF 110 that a second tunnel endpoint may be reserved for buffered DL data from the old I-UPF.

In an example, the new UPF (intermediate) may send to SMF 160 an N4 Session Establishment Response message. In case the UPF may allocate CN Tunnel Info, the UPF 110 may provide DL CN Tunnel Info for the UPF 110 acting as PDU Session Anchor and UL CN Tunnel Info (e.g., CN N3 tunnel info) to the SMF 160. If the Data forwarding indication may be received, the new (intermediate) UPF 110 acting as N3 terminating point may send DL CN Tunnel Info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU Session or may remove the old I-UPF 110-2, the SMF 160 may send N4 Session Modification Request message to PDU Session Anchor, PSA UPF 110-3, providing the data forwarding indication and DL tunnel information from new intermediate UPF 110.

In an example, if the new intermediate UPF 110 may be added for the PDU Session, the (PSA) UPF 110-3 may begin to send the DL data to the new I-UPF 110 as indicated in the DL tunnel information.

In an example, if the Service Request may be triggered by the network, and the SMF 160 may remove the old I-UPF 110-2 and may not replace the old I-UPF 110-2 with the new I-UPF 110, the SMF 160 may include the Data Forwarding indication in the request. The Data Forwarding Indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 Session Modification Response. In an example, if the Data Forwarding Indication may be received, the PSA UPF 110-3 may become as N3 Terminating Point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 (intermediate) an N4 Session Modification Request (e.g., may comprise New UPF 110 address, New UPF 110 DL Tunnel ID, and/or the like). In an example, if the service request may be triggered by the network, and/or the SMF 160 may remove the old (intermediate) UPF 110-2, the SMF 160 may send the N4 Session Modification Request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF (PSA) 110-3 acting as N3 terminating point. The SMF 160 may start a timer to monitor the forwarding tunnel. In an example, the old (intermediate) UPF 110-2 may send N4 Session Modification Response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF may not be assigned for the PDU session and forwarding tunnel may be established to the UPF (PSA) 110-3, the old (intermediate) UPF 110-2 may forward its buffered data to the UPF (PSA) 110-3 acting as N3 Terminating Point.

In an example, the SMF 160 may send to the AMF 155 an N11 message e.g., a Nsmf_PDUSession_UpdateSMContext Response (comprising: N1 SM container (PDU Session ID, PDU Session re-establishment indication), N2 SM information (PDU Session ID, QoS profile, CN N3 Tunnel Info, S-NSSAI), Cause), upon reception of the Nsmf_PDUSession_UpdateSMContext Request with a cause including e.g., "establishment of user plane resources". The SMF 160 may determine whether UPF 110 reallocation may be performed, based on the UE 100 location information, UPF 110 service area and operator policies. In an example, for a PDU Session that the SMF 160 may determine to be served by the current UPF 110, e.g., PDU Session Anchor or intermediate UPF, the SMF 160 may generate N2 SM information and may send an Nsmf_PDUSession_UpdateSMContext Response to the AMF 155 to establish the User Plane(s). The N2 SM information may contain information that the AMF 155 may provide to the RAN 105. In an example, for a PDU Session that the SMF 160 may determine as requiring a UPF 110 relocation for PDU Session Anchor UPF, the SMF 160 may reject the activation of UP of the PDU Session by sending Nsmf_PDUSession_UpdateSMContext Response that may contain N1 SM container to the UE 100 via the AMF 155. The N1 SM container may include the corresponding PDU Session ID and PDU Session re-establishment indication.

Upon reception of the Namf_EventExposure_Notify_from the AMF 155 to the SMF 160, with an indication that the UE 100 is reachable, if the SMF 160 may have pending DL data, the SMF 160 may invokes the Namf_Communication_N1N2MessageTransfer service operation to the AMF 155 to establish the User Plane(s) for the PDU Sessions, In an example, the SMF 160 may resume sending DL data notifications to the AMF 155 in case of DL data.

In an example, the SMF 160 may send to a message to the AMF 155 to reject the activation of UP of the PDU Session by including a cause in the Nsmf_PDUSession_UpdateSMContext Response if the PDU Session may correspond to a LADN and the UE 100 may be outside the area of availability of the LADN, or if the AMF 155 may notify the SMF 160 that the UE 100 may be reachable for regulatory prioritized service, and the PDU Session to be activated may not for a regulatory prioritized service; or if the SMF 160 may decide to perform PSA UPF 110-3 relocation for the requested PDU Session.

In an example, the AMF 155 may send to the (R)AN 105 an N2 Request message (e.g., N2 SM information received from SMF 160, security context, AMF 155 Signaling Connection ID, Handover Restriction List, MM NAS Service Accept, list of recommended cells/TAs/NG-RAN node identifiers). In an example, the RAN 105 may store the Security Context, AMF 155 Signaling Connection Id, QoS Information for the QoS Flows of the PDU Sessions that may be activated and N3 Tunnel IDs in the UE 100 RAN 105 context. In an example, the MM NAS Service Accept may include PDU Session status in the AMF 155. If the activation of UP of a PDU Session may be rejected by the SMF 160, the MM NAS Service Accept may include the PDU Session ID and the reason why the user plane resources may not activated (e.g. LADN not available). Local PDU Session release during the Session Request procedure may be indicated to the UE 100 via the Session Status.

In an example, if there are multiple PDU Sessions that may involve multiple SMFs, the AMF 155 may not wait for responses from all SMFs before it may send N2 SM information to the UE 100. The AMF 155 may wait for all responses from the SMFs before it may send MM NAS Service Accept message to the UE 100.

In an example, the AMF 155 may include at least one N2 SM information from the SMF 160 if the procedure may be triggered for PDU Session User Plane activation. AMF 155 may send additional N2 SM information from SMFs in separate N2 message(s) (e.g. N2 tunnel setup request), if there is any. Alternatively, if multiple SMFs may be involved, the AMF 155 may send one N2 Request message to (R)AN 105 after all the Nsmf_PDUSession_UpdateSMContext Response service operations from all the SMFs associated with the UE 100 may be received. In such case, the N2 Request message may include the N2 SM information received in each of the Nsmf_PDUSession_UpdateSMContext Response and PDU Session ID to enable AMF 155 to associate responses to relevant SMF 160.

In an example, if the RAN 105 (e.g., NG RAN) node may provide the list of recommended cells/TAs/NG-RAN node identifiers during the AN Release procedure, the AMF 155 may include the information from the list in the N2 Request. The RAN 105 may use this information to allocate the RAN 105 Notification Area when the RAN 105 may decide to enable RRC Inactive state for the UE 100.

If the AMF 155 may receive an indication, from the SMF 160 during a PDU Session Establishment procedure that the UE 100 may be using a PDU Session related to latency sensitive services, for any of the PDU Sessions established for the UE 100 and the AMF 155 has received an indication from the UE 100 that may support the CM-CONNECTED with RRC Inactive state, then the AMF 155 may include the UE's "RRC Inactive Assistance Information". In an example, the AMF 155 based on network configuration, may include the UE's "RRC Inactive Assistance Information".

In an example, the (R)AN 105 may send to the UE 100 a message to perform RRC Connection Reconfiguration with the UE 100 depending on the QoS Information for all the QoS Flows of the PDU Sessions whose UP connections may be activated and Data Radio Bearers. In an example, the User Plane security may be established.

In an example, if the N2 Request may include a MM NAS Service Accept message, the RAN 105 may forward the MM NAS Service Accept to the UE 100. The UE 100 may locally delete context of PDU Sessions that may not be available in 5GC.

In an example, if the N1 SM information may be transmitted to the UE 100 and may indicate that some PDU Session(s) may be re-established, the UE 100 may initiate PDU Session re-establishment for the PDU Session(s) that me be re-established after the Service Request procedure may be complete.

In an example, after the User Plane radio resources may be setup, the uplink data from the UE 100 may be forwarded to the RAN 105. The RAN 105 (e.g., NG-RAN) may send the uplink data to the UPF address and Tunnel ID provided.

In an example, the (R)AN 105 may send to the AMF 155 an N2 Request Ack (e.g., N2 SM information (comprising: AN Tunnel Info, List of accepted QoS Flows for the PDU Sessions whose UP connections are activated, List of rejected QoS Flows for the PDU Sessions whose UP connections are activated)). In an example, the N2 request message may include N2 SM information(s), e.g. AN Tunnel Info. RAN 105 may respond N2 SM information with separate N2 message (e.g. N2 tunnel setup response). In an example, if multiple N2 SM information are included in the N2 Request message, the N2 Request Ack may include multiple N2 SM information and information to enable the AMF 155 to associate the responses to relevant SMF 160.

In an example, the AMF 155 may send to the SMF 160 a Nsmf_PDUSession_UpdateSMContext Request (N2 SM information (AN Tunnel Info), RAT Type) per PDU Session. If the AMF 155 may receive N2 SM information (one or multiple) from the RAN 105, then the AMF 155 may forward the N2 SM information to the relevant SMF 160. If the UE 100 Time Zone may change compared to the last reported UE 100 Time Zone then the AMF 155 may include the UE 100 Time Zone IE in the Nsmf_PDUSession_UpdateSMContext Request message.

In an example, if dynamic PCC is deployed, the SMF 160 may initiate notification about new location information to the PCF (if subscribed) by invoking an event exposure notification operation (e.g., a Nsmf_EventExposure_Notify service operation). The PCF may provide updated policies by invoking a policy control update notification message (e.g., a Npcf_SMPolicyControl_UpdateNotify operation).

In an example, if the SMF 160 may select a new UPF 110 to act as intermediate UPF 110 for the PDU session, the SMF 160 may initiates an N4 Session modification procedure to the new I-UPF 110 and may provide AN Tunnel Info. The Downlink Data from the new I-UPF may be forwarded to RAN 105 and UE 100. In an example, the UPF may send to the SMF 160, an N4 Session Modification Response. In an example, the SMF 160 may send to the AMF 155, an Nsmf_PDUSession_UpdateSMContext Response.

In an example, if forwarding tunnel may be established to the new I-UPF 110 and if the timer SMF 160 set for forwarding tunnel may be expired, the SMF 160 may sends N4 Session modification request to new (intermediate) UPF 110 acting as N3 terminating point to release the forwarding tunnel. In an example, the PSA UPF 110-3 may send to the SMF 160 an N4 session modification response. In an example, the SMF 160 may send to the old UPF 110-2 an N4 Session Modification Request, or N4 Session Release Request. In an example, if the SMF 160 may continue using the old UPF 110-2, the SMF 160 may send an N4 Session Modification Request, providing AN Tunnel Info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 Session Release Request (Release Cause) to the old intermediate UPF 110-2.

In an example, the old intermediate UPF 110-2 may send to the SMF 160 an N4 Session Modification Response or N4 Session Release Response. The old UPF 110-2 may acknowledge with the N4 Session Modification Response or N4 Session Release Response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify_towards the SMF 160 if the SMF 160 had subscribed for UE 100 moving into or out of "area of interest" and if the UE's current location may indicate that it may be moving into or moving outside of the "Area of interest" subscribed, or if the SMF 160 had subscribed for "LADN DNN" and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

In an example embodiment as depicted in FIG. 10, FIG. 11, FIG. 12, and FIG. 15, when the UE 100 triggered service request procedure may be in progress, the current UE 100 triggered Service Request procedure may cause unnecessary data notification messages which may increase a load of the AMF 155. In an example, data notifications (e.g., downlink data notifications) may occur when sending uplink data by the UE 100 may cause arrival of (downlink) data in response to the uplink data that may arrive at the UPF 110 before arrival of any N4 session modification request indicating that the (downlink) data may be sent from the UPF 110 to the RAN 105 and the UE 100.

In an example, if the AMF 155 may receive a data notification, or a packet notification from the SMF 160 during the UE 100 triggered service request procedure and before the establishment of the downlink user plane, UP connectivity, the AMF 155 may not send a paging message to the UE 100. In an example, across all the UEs served by the AMF 155, the AMF 155 may monitor a first rate at which data notifications may arrive. If the first rate may become significant (e.g., as configured by an operator) and the load at the AMF 155 may exceed a threshold, or a configured value (e.g., an operator configured value), the AMF 155 may request to delay sending data notifications (e.g., a packet notification delay request, a delay downlink data notification message, a delay downlink packet notification message, and/or the like). In an example, the request may be handled at the SMF 160 and/or at the UPF 110. In an example, the AMF 155 may indicate to the SMF 160 to delay data notification based on a value or for a time duration of a first delay duration parameter (e.g., the value of the first delay duration parameter may be given as an integer multiple of 50 milliseconds, e.g., 100 milliseconds, 150 milliseconds, or zero). The SMF 160 and/or the UPF 110 may use the value of the first delay duration parameter to delay in between receiving (downlink) data and sending the (downlink) data notification message. In an example, the AMF 155 may update the value of the first delay duration parameter (e.g., the first rate of data notification arrivals is monitored every 60 seconds and the value of the first delay duration parameter is determined by the AMF 155). In an example, the AMF 155 may employ the N11 message, Nsmf_PDUSession_UpdateSMContext Request message, and/or the like, of the UE 100 initiated Service Request procedure to indicate delaying (downlink) data notification request to send the first delay duration parameter to the SMF 160.

In an example, to determine the amount of delay requested by a given AMF 155, the SMF 160 may use the last N11 message, or Nsmf_PDUSession_UpdateSMContext Request message which may be part of the Service Request procedure, or, may use one of the N11 message, or Nsmf_PDUSession_UpdateSMContext Request message of the Service Request received within the preceding t time units (e.g., t may be 30 seconds).

In an example, the AMF 155 may determine the value for the first delay duration parameter by adaptively increasing the value when a rate of data notification arrival at the AMF 155 is high, and decreasing the value when the rate of data notification arrival at the AMF 155 is low.

In an example, the AMF 155 may monitor and/or measure the average time from the reception of the unnecessary (downlink) data notification to the reception of the N11 request message or an N11 response from the SMF 160 in the same UE 100 triggered Service Request Procedure. The value of the first delay duration parameter may be calculated from the measured average, by adding a safety margin.

In an example, if the SMF 160 and/or the UPF 110 may determine from the last N11 message and/or N4 session modification request which may be part of the service request procedure that a given AMF 155 may request delaying of the (downlink) data notification by the value of the first delay duration parameter, the SMF 160 and/or the UPF 110 may (for UEs of the AMF 155) buffer the (downlink) data for a period as determined by a timer based on the first delay duration parameter. If the DL-TEID and RAN 105 (e.g., gNB) address for the UE 100 may be received before the expiry of the timer, the timer may be cancelled, and the network triggered service request procedure is finished without sending the (downlink) data notification message to the AMF 155, e.g., (downlink) data may be sent to the UE 100. In an example, if the timer expires, the (downlink) data notification message may be sent to the AMF 155 upon expiry of the timer.

Figure 12:
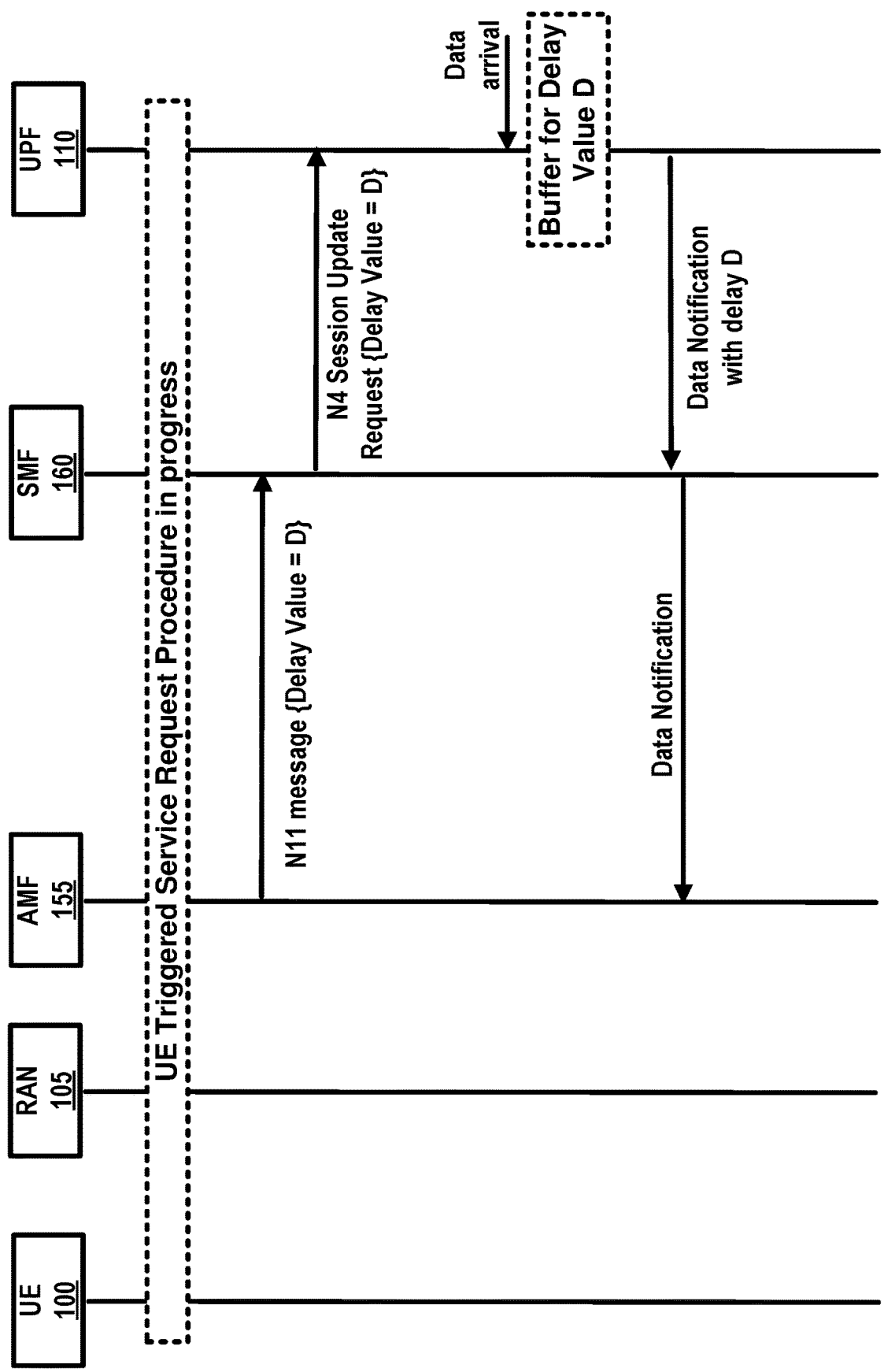
FIG. 12 is an example call flow as per an aspect of an embodiment of the present disclosure.
Figure 15:
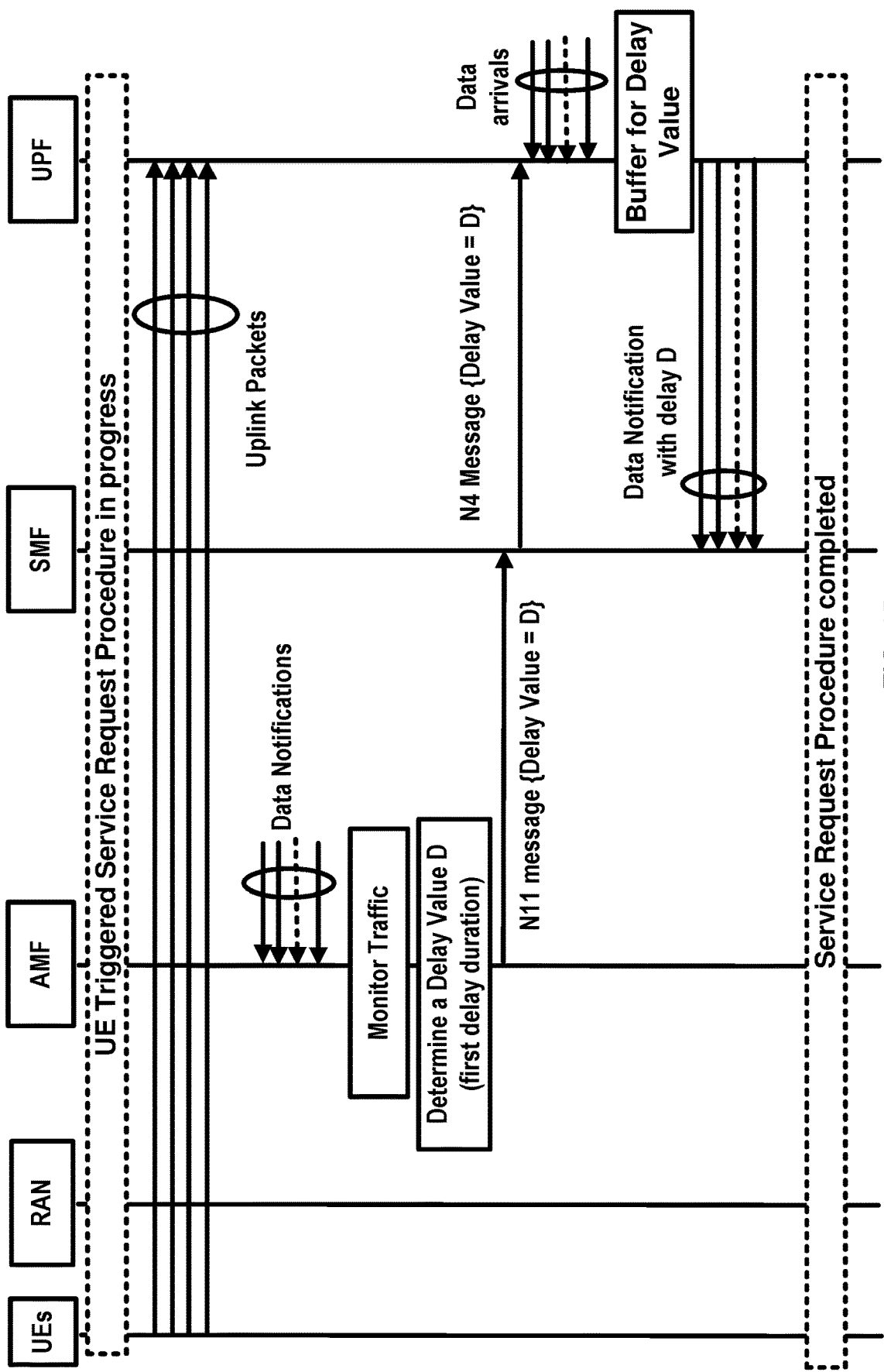
FIG. 15 is an example call flow as per an aspect of an embodiment of the present disclosure.

In an example embodiment as depicted in FIG. 12 and FIG. 15, the AMF 155 may send to the SMF 160 a first message configured to indicate a request to delay data notifications. The first message (e.g., a Nsmf_PDUSession_UpdateSMContext Request) may comprise one or more of the first delay duration parameter, a packet notification delay request, an N2 SM information (e.g., AN Tunnel Info), RAT Type, and/or the like.

In an example, the SMF 160 may send to the UPF 110 a second message (e.g., via an N4 Session Modification Request, and/or the like) configured to indicate delaying transmission of data notifications from the UPF 110 to the SMF 160. The second message may comprise the first delay duration parameter, the packet notification delay request, the AN Tunnel Info, list of accepted QoS flows, and/or the like. The UPF 110 may buffer the data for the time duration of the first delay duration parameter or based on the elements of the second message.

Figure 14:
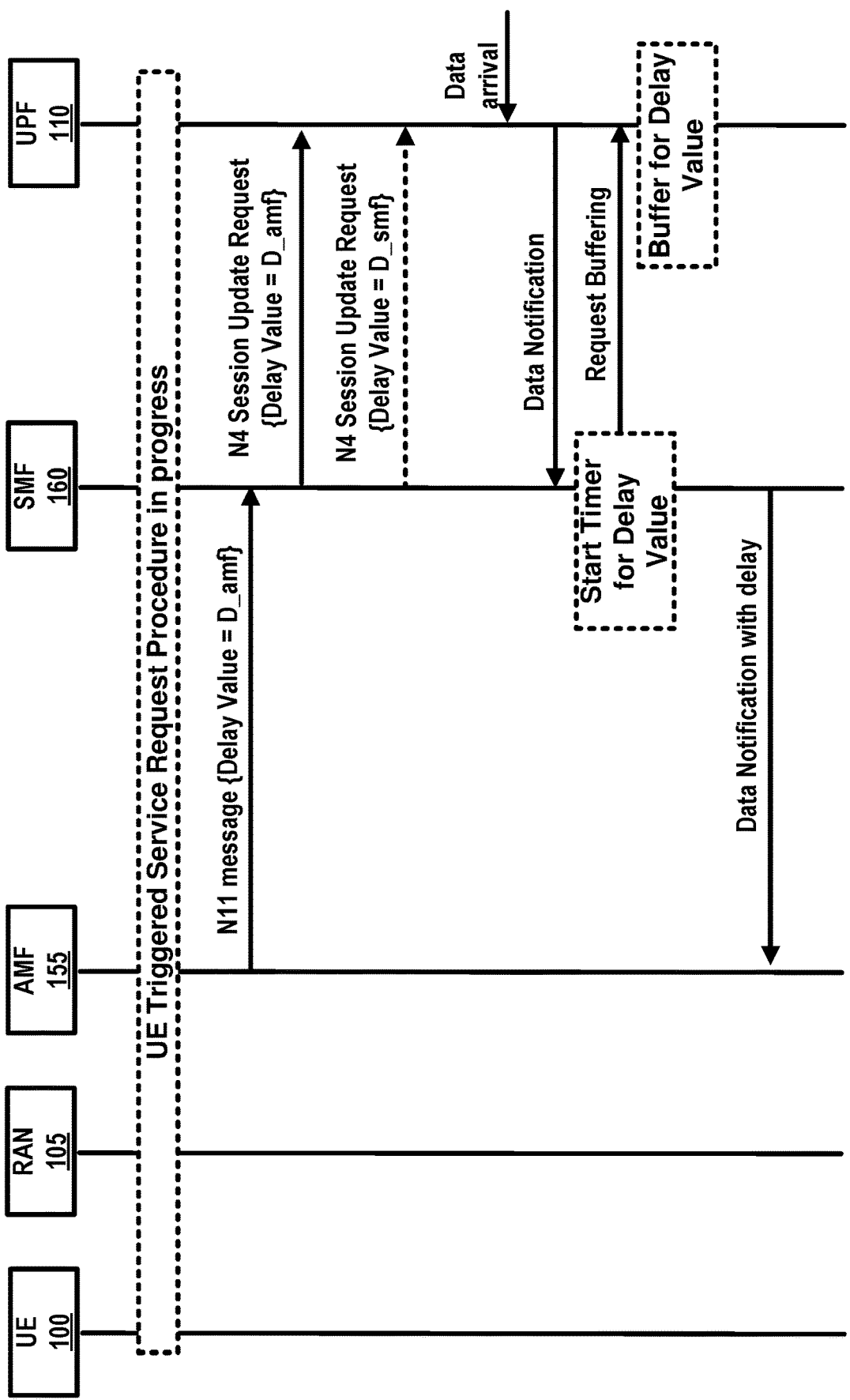
FIG. 14 is an example call flow as per an aspect of an embodiment of the present disclosure.

In an example FIG. 14, the SMF 160 may determine a second delay duration parameter. The SMF 160 may send to the UPF 110 the second message via the N4 Session Modification Request configured to indicate delaying transmission of data notifications from the UPF 110 to the SMF 160. The second message may comprise the second delay duration parameter, the packet notification delay request, the AN Tunnel Info, list of accepted QoS flows, and/or the like. The UPF 110 may buffer the data for the time duration of the first delay duration parameter or a time duration of the second delay duration parameter, based on the second delay duration parameter, and/or elements of the second message. In an example, the second delay duration parameter may be based on a second rate of data notification (e.g., arrival rate of N4 messages from all UPFs that are served by the SMF 160, arrival rate of N4 messages at the SMF 160 for all the UEs served by the SMF 160, arrival rate of N4 messages for one or more network slices/network slice instances, and/or the like). The SMF 160 may monitor and/or measure the second rate of data notification, and/or other N4 messages and if the second rate may become significant and/or may exceed a preconfigured value, the SMF 160 may determine the second delay duration parameter, and/or notify the UPF 110 to delay sending the (downlink) data notifications via the second message.

Figure 13:
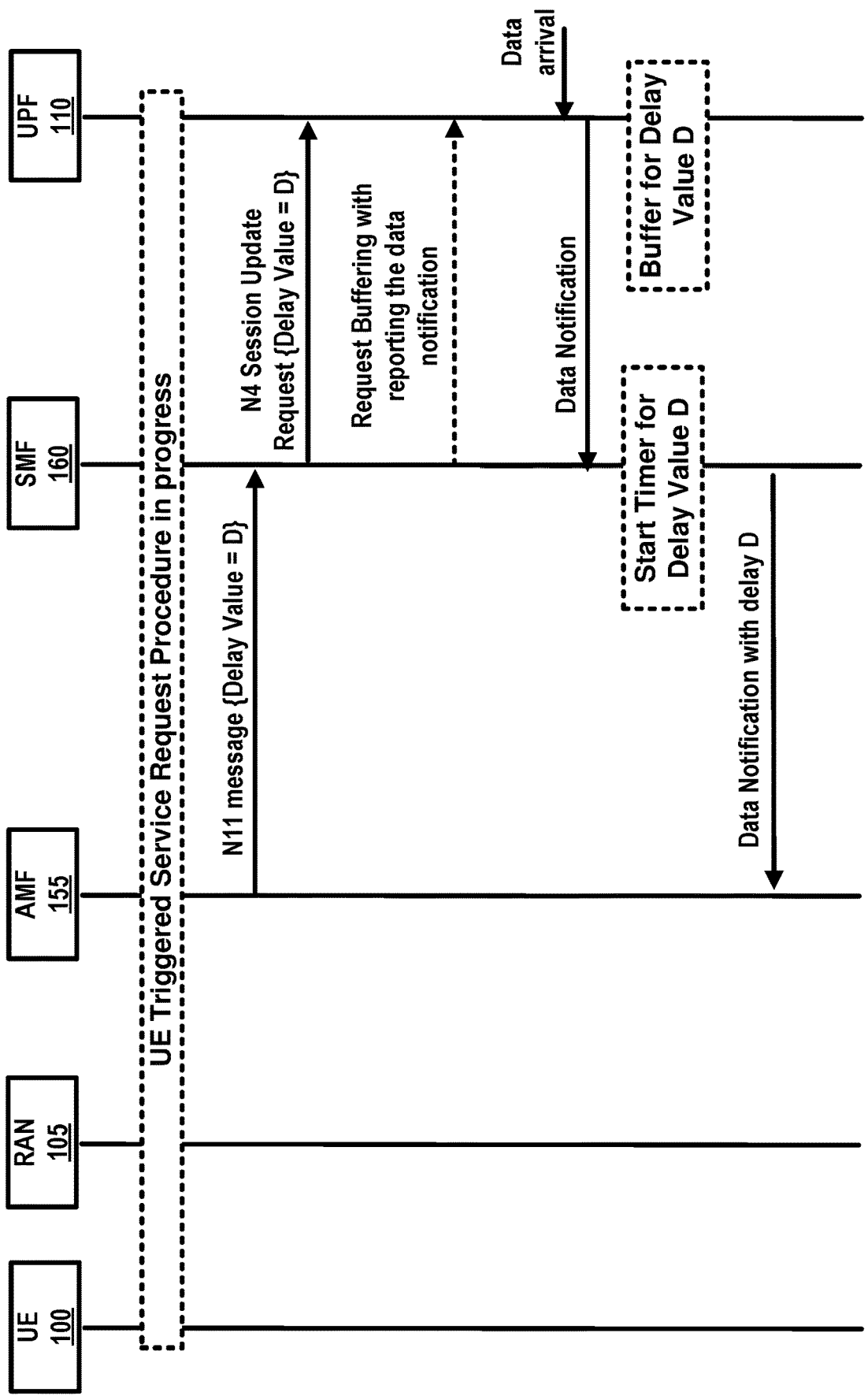
FIG. 13 is an example call flow as per an aspect of an embodiment of the present disclosure.

In an example as depicted in FIG. 13, the SMF 160 may determine the value of the second delay duration parameter by adaptively increasing the value when a rate of data notification arrival at the SMF 160 is high, and decreasing the value when the rate of data notification arrival at the SMF 160 is low.

In an example, the SMF 160 may suspend sending the packet notification, or the data notification to the AMF 155 for the time duration of the first delay duration parameter.

In example FIG. 12 and FIG. 14, if the first delay duration parameter and/or the second delay duration parameter may be handled by the UPF 110, the SMF 160 may include the first delay duration parameter and/or the second delay duration parameter in the second message (e.g., N4 session modification request, N4 session creation request, and/or the like) and the UPF 110 may delay sending of (downlink) data notification upon next (downlink) data arrival. In an example, the SMF 160 may indicate to the UPF 110 via the second message to delay sending data notification for the time duration of the first delay duration parameter, and start buffering the (downlink) data for the time duration of the first delay duration parameter.

In an example as depicted in FIG. 13, if the first delay duration parameter and/or the second delay duration parameter may be handled by the SMF 160, the SMF 160 may provide the UPF 110 with instructions for at least the following behaviors: buffer without reporting the arrival of first downlink packet, buffer with reporting the arrival of first downlink packet, and/or drop packets. In an example FIG. 13, in response to receiving the first message, the SMF 160 may send a third message to the UPF 110 indicating the UPF 110 to start buffering the (downlink) data and report the arrival of the (downlink) data to the SMF 160. When the UPF 110 may report the arrival of the (downlink) data packet, the SMF 160 may delay sending of the (downlink) data notification to the AMF 155 for the time duration of the first delay duration parameter and/or the second delay duration parameter. In an example, if the first delay duration parameter may be handled by the SMF 160, the SMF 160 may send the third message to the UPF 110, indicating the UPF 110 to start buffering the (downlink) data, and indicating the UPF 110 to send the data notification to the SMF 160 to report arrival of the (downlink) data. The SMF 160 may delay sending of the (downlink) data notification to the AMF 155 based on the time duration of the first delay duration parameter and/or the second delay duration parameter.

In an example, upon expiry of the timer if the UPF 110 may not send the data to the RAN 105 and the UE 100, the UPF 110 may send the data notification to the SMF 160. The SMF 160 may send to the AMF 155 the data notification received from the UPF 110. In an example, the timer may be configured based on the value of first delay duration parameter and/or the second delay duration parameter. In an example, the UPF 110 may discard the data upon expiry of the timer.

In an example embodiment, the AMF 155 may monitor the arrival rate of data notifications from all UEs (e.g., the first rate) that are served by the AMF 155, and/or arrival rate of data notifications from all UEs served by the AMF 155 and may be for a specific slice type, slice instance, S-NSSAI, and/or the like. In an example, the first delay duration parameter and/or the second delay duration parameter may be specific to a slice type, slice instance, S-NSSAI, and/or the like. In an example, more than one first delay duration parameter and second delay duration parameter may be determined by the AMF 155, and/or the SMF 160 that may be specific to a slice type, slice instance, S-NSSAI, and/or the like.

In an example embodiment, the AMF 155 may receive from the wireless device, the service request. The AMF 155 may send to the SMF 160 in response to the service request, the first message if the load of the AMF 155 is higher than the threshold value. In an example, the first message may indicate the packet notification delay request for the data arrival for the wireless device. The first message may comprise at least one of the first delay duration parameter, the access network tunnel information, the session management information, and/or the like.

In an example, the SMF 160 may send to the UPF 110, the second message indicating the packet notification delay request. The second message may comprise at least one of the first delay duration parameter, the access network tunnel information and/or the like.

In an example embodiment, the AMF 155 may determine the first delay duration parameter based on the data notification arrival rate at the AMF 155.

In an example embodiment, the SMF 160 may suspend sending the packet notification to the AMF 155 for the time duration of the first delay duration parameter before the UPF 110 may be able to send downlink data to the wireless device or the RAN 105 node In an example embodiment, the AMF 155 may suspend sending the paging message when receiving the packet notification for the wireless device.

In an example embodiment, the SMF 160 may determine the second delay duration parameter based on the data notification arrival rate at the SMF 160.

In an example embodiment, the SMF 160 may send to the UPF 110, the second delay duration parameter.

In an example embodiment, the UPF 110 may buffer the downlink data for the wireless device at least for the time duration of the first delay duration parameter and/or may delay sending the data notification for the downlink data.

In an example embodiment, the AMF 155 may receive the service request from the wireless device. The AMF 155 may send to the SMF 160 in response to the service request, the first message if a load of the AMF 155 is higher than a threshold value. The first message may indicate the packet notification delay request for the data arrival for the wireless device and may comprises at least one of the first delay duration parameter, the access network tunnel information, the session management information, and/or the like.

In an example, the SMF 160 may start a timer that may be determined based on the first delay duration parameter. The SMF 160 may send to the UPF 110, the third message. The third message may indicate to the UPF 110 to start buffering the downlink data. In an example, the SMF 160 may suspend sending the packet notification to the AMF 155 for a time duration of the first delay duration parameter. In an example embodiment, the UPF 110 may buffer the downlink data for a time duration of the first delay duration parameter. In an example, the UPF 110 may send the fourth message to the SMF 160 indicating the packet notification.

In an example embodiment as depicted in FIG. 15, an access and mobility management function (AMF) may receive from one or more session management functions, a plurality of data notifications for activation of user plane connections for a plurality of wireless devices. The AMF may determine a first time duration based on a traffic of the plurality of data notifications. In an example, the first time duration may be for delaying data notifications to the AMF. The AMF may send to the one or more session management functions (SMFs), at least one first message to delay sending a plurality of data notifications to the AMF. The at least one first message may comprise a value of a parameter indicating the first time duration. The at least one first message may further comprise a session management information. The one or more session management functions may send to a plurality of user plane functions, at least one second message indicating a request to delay data notifications. The at least one second message may comprise the parameter indicating the first time duration, the session management information, and/or the like. In an example, the plurality of user plane functions may delay sending a plurality of data notifications to the one or more session management functions for the first time duration. In an example, the one or more session management functions may delay sending the plurality of data notifications to the AMF for the first time duration.

In an example, a plurality of UPFs may receive downlink data in response to transmission of uplink data by the wireless device during the service request. In an example, the one or more session management functions may delay sending a plurality of data notifications to the AMF for the first time duration before the UPF is able to send downlink data to a wireless device via a base station. In an example, the AMF may suspend sending a paging message when receiving the data notification for the wireless device. In an example, a session management function (SMF), may determine a second time duration. The determining may be based on a traffic of a plurality of data notifications at the SMF. The determining may be based on a load information of the SMF. The SMF may send to a plurality of UPFs, a parameter indicating the second time duration. In an example, the SMF may buffer the downlink data at least for a time duration of the first delay duration parameter. In an example, the SMF may buffer the downlink data at least for the second time duration. In an example, the plurality of UPFs may buffer the downlink data for the wireless device at least for the second time duration. In an example, the UPF(s) may delay sending a data notification message for the second time duration when receiving a data notification for the wireless device. In an example, the at least one first message may be a session establishment request message, a session modification request message, and/or the like. In an example, the at least one second message may be a session modification request message. In an example, the session management information may comprise identifier of at least one packet data unit (PDU) session, an operation type, location information of the wireless device, an access type information, a radio access technology information, and/or the like. In an example, the AMF may receive from the SMF, a data notification indicating a request to activate a user plane connection for a wireless device in response to expiry of the first time duration.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

Figure 16:
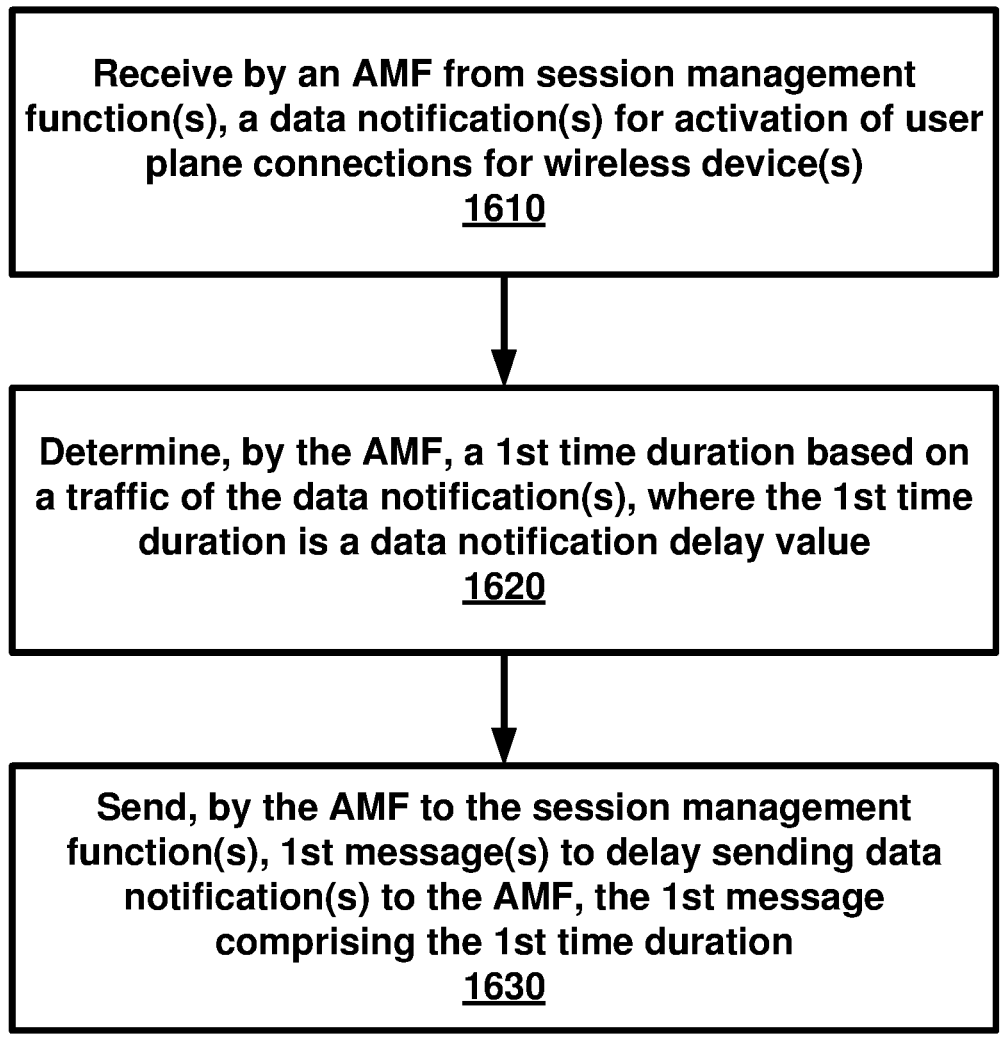
FIG. 16 is a flow diagram of an aspect of an embodiment of the present disclosure.

FIG. 16 is a flow diagram of an aspect of an embodiment of the present disclosure. At 1610, an access and mobility management function (AMF) may receive a plurality of data notifications from one or more session management functions. The plurality of data notifications may be for activation of user plane connections for a plurality of wireless devices. At 1620, the AMF may determine a first time duration based on a traffic of the plurality of data notifications. The first time duration may be a data notification delay value. At 1630, the AMF may send at least one first message to the one or more session management functions. The at least one first message may be to delay sending a plurality of data notifications to the AMF. The at least one first message may comprise the first time duration.

According to an example embodiment, the at least one first message may comprise a session management information. According to an example embodiment, the session management information may comprise an identifier of at least one packet data unit (PDU) session. According to an example embodiment, the session management information may comprise an operation type. According to an example embodiment, the session management information may comprise location information of a wireless device. According to an example embodiment, the session management information may comprise an access type information. According to an example embodiment, the session management information may comprise a radio access technology information. According to an example embodiment, the one or more session management functions may send at least one second message to a plurality of user plane functions. The at least one second message may indicate a request to delay data notifications. The at least one second message may comprise the first time duration. The at least one second message may comprise the session management information. According to an example embodiment, the sending of a plurality of data notifications from the plurality of user plane functions to the one or more session management functions may be delayed for the first time duration. According to an example embodiment, the at least one second message may be a session modification request message. According to an example embodiment, the sending the plurality of data notifications from the one or more session management functions to the AMF may be delayed for the first time duration. According to an example embodiment, downlink data may be received by a plurality of user plane functions in response to transmission of uplink data by a wireless device during a service request. According to an example embodiment, the sending a plurality of data notifications from the one or more session management functions to the AMF may be delayed for the first time duration before a user plane function is able to send downlink data to a wireless device via a base station. According to an example embodiment, the AMF may suspend sending a paging message when receiving a data notification for a wireless device. According to an example embodiment, a second time duration may be determined by a session management function. According to an example embodiment, the determining may be based on a traffic of a plurality of data notifications at the session management function. According to an example embodiment, the determining may be based on load information of the session management function. According to an example embodiment, the session management function may send a parameter to a plurality of user plane functions. The parameter may indicate the second time duration. According to an example embodiment, the plurality of user plane functions may buffer downlink data for the plurality of wireless devices at least for the second time duration. According to an example embodiment, the plurality of user plane functions may delay sending a data notification message for the second time duration when receiving a data notification for a wireless device. According to an example embodiment, the session management function may buffer downlink data for at least the second time duration. According to an example embodiment, a session management function may buffer downlink data for at least the first time duration. According to an example embodiment, the at least one first message may comprise a session establishment request message. According to an example embodiment, the at least one first message may comprise a session modification request message. According to an example embodiment, the AMF may receive a data notification from the session management function. The data notification may indicate a request to activate a user plane connection for a wireless device in response to expiry of the first time duration.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:
1. A method comprising:
    receiving, by an access and mobility management function (AMF) from one or more session management functions, one or more first messages indicating user plane connection activations for a plurality of packet data unit (PDU) sessions to deliver downlink user data to one or more wireless devices;

determining, by the AMF, a first time duration based on the user plane connection activations for the plurality of PDU sessions, wherein the first time duration indicates a delay between receiving a downlink data packet and notifying the AMF about user plane connection activation for the downlink data packet; and sending, by the AMF to the one or more session management functions, one or more second messages to delay the sending of further user plane connection activations to the AMF, the one or more second messages indicating a value of the first time duration.

2. The method of claim 1, wherein the one or more second messages further comprise a session management information.

3. The method of claim 2, further comprising sending by the one or more session management functions to a plurality of user plane functions, one or more third messages to delay the sending of further user plane connection activations, the one or more third messages comprising:

the value of the first time duration; and
the session management information.

4. The method of claim 3, further comprising delaying sending of further user plane connection activations from the plurality of user plane functions to the one or more session management functions for the first time duration.

5. The method of claim 2, wherein the session management information comprises:

an identifier of at least one packet data unit (PDU) session;
an operation type;
location information of a wireless device of the one or more wireless devices;
an access type information; and
a radio access technology information.

6. The method of claim 3, wherein the one or more third messages are a session modification request message.

7. The method of claim 1, further comprising delaying sending of further user plane connection activations from the one or more session management functions to the AMF for the first time duration.

8. The method of claim 1, further comprising receiving by a plurality of user plane functions, downlink data in response to transmission of uplink data by a wireless device of the one or more wireless devices during a service request.

9. The method of claim 1, further comprising delaying sending further user plane connection activations from the one or more session management functions to the AMF for the first time duration before a user plane function is able to send downlink data to a wireless device via a base station.

10. The method of claim 1, further comprising suspending, by the AMF, sending of a paging message when receiving user plane connection activations.

11. The method of claim 1, further comprising determining, by a session management function of the one or more session management functions, a second time duration.

12. The method of claim 11, wherein the determining is based on a traffic of the user plane connection activations at the session management function.

13. The method of claim 11, wherein the determining is based on a load information of the session management function.

14. The method of claim 13, further comprising sending, by the session management function to a plurality of user plane functions, a parameter indicating the second time duration.

15. The method of claim 14, further comprising buffering, by the plurality of user plane functions, downlink data for a wireless device of the one or more wireless devices at least for the second time duration.

16. The method of claim 15 further comprising delaying, by the plurality of user plane functions sending a data notification message for the second time duration when receiving a user plane connection activation for the wireless device.

17. The method of claim 11, further comprising buffering, by the session management function, the downlink user data at least for the second time duration.

18. The method of claim 11, further comprising buffering, by the session management function, the downlink data at least for a time duration of the first time duration.

19. The method of claim 1, wherein the one or more second messages is a session establishment request message or a session modification request message.

20. The method of claim 1, further comprising receiving, by the AMF from the one or more session management functions, a data notification indicating a request to activate a user plane connection for a wireless device in response to expiry of the first time duration.

* * * * *